(12) United States Patent
Huang et al.

(10) Patent No.: US 9,365,766 B2
(45) Date of Patent: Jun. 14, 2016

(54) WAVELENGTH CONVERSION COMPONENT HAVING PHOTO-LUMINESCENCE MATERIAL EMBEDDED INTO A HERMETIC MATERIAL FOR REMOTE WAVELENGTH CONVERSION

(75) Inventors: Diyun Huang, Fremont, CA (US); Bing Dai, Fremont, CA (US); Charles Edwards, Pleasanton, CA (US)

(73) Assignee: Intematix Corporation, Fremont, CA (US)

( * ) Notice: Subject to any disclaimer, the term of this patent is extended or adjusted under 35 U.S.C. 154(b) by 319 days.

(21) Appl. No.: 13/273,200

(22) Filed: Oct. 13, 2011

(65) Prior Publication Data
US 2013/0094178 A1    Apr. 18, 2013

(51) Int. Cl.
| | |
|---|---|
| H01J 1/62 | (2006.01) |
| H01J 63/04 | (2006.01) |
| C09K 11/02 | (2006.01) |
| F21K 99/00 | (2016.01) |
| F21S 4/00 | (2016.01) |

(Continued)

(52) U.S. Cl.
CPC ............... C09K 11/02 (2013.01); F21K 9/135 (2013.01); F21K 9/56 (2013.01); F21S 4/008 (2013.01); F21S 4/28 (2016.01); F21S 8/026 (2013.01); F21V 9/16 (2013.01); F21V 29/773 (2015.01); F21L 4/00 (2013.01); F21V 3/00 (2013.01); F21V 7/06 (2013.01); F21Y 2101/02 (2013.01); F21Y 2103/003 (2013.01); F21Y 2105/001 (2013.01)

(58) Field of Classification Search
CPC ........... C09K 11/02; F21K 9/56; F21K 9/135; F21V 3/00; F21V 7/06; F21V 9/16; F21V 29/773; F21S 4/008; F21S 8/026; F21Y 2101/02; F21Y 2103/003; F21Y 2105/001; F21L 4/00
USPC ......... 313/498–512, 489, 110, 112, 485, 493, 313/635

See application file for complete search history.

(56) References Cited

U.S. PATENT DOCUMENTS

| 3,290,255 A | 12/1966 | Smith |
| 3,593,055 A | 7/1971 | Geusic et al. |

(Continued)

FOREIGN PATENT DOCUMENTS

| EP | 647694 | 4/1995 |
| GB | 2 017 409 | 10/1979 |

(Continued)

OTHER PUBLICATIONS

"Fraunhofer-Gesellschaft: Research News Special1997", http://www.fhg.de/press/md-e/md1997/sondert2.hlm,(accessed on Jul. 23, 1998), Jan. 1997, Publisher: Fraunhofer Institute.

(Continued)

Primary Examiner — Anne Hines
Assistant Examiner — Jose M Diaz
(74) Attorney, Agent, or Firm — Vista IP Law Group, LLP

(57) ABSTRACT

Disclosed are improved wavelength conversion components having photo-luminescent materials embedded into a hermetic material. Phosphor materials are embedded into a layer of glass, which is then utilized in a remote phosphor LED lighting apparatus. Methods for manufacturing these advanced wavelength conversion components are also described.

14 Claims, 19 Drawing Sheets

(51) Int. Cl.

| | |
|---|---|
| *F21S 8/02* | (2006.01) |
| *F21V 9/16* | (2006.01) |
| *F21V 29/77* | (2015.01) |
| *F21V 3/00* | (2015.01) |
| *F21V 7/06* | (2006.01) |
| *F21Y 101/02* | (2006.01) |
| *F21Y 105/00* | (2016.01) |
| *F21L 4/00* | (2006.01) |
| *F21Y 103/00* | (2016.01) |

(56) References Cited

U.S. PATENT DOCUMENTS

| | | |
|---|---|---|
| 3,670,193 A | 6/1972 | Thorington et al. |
| 3,676,668 A | 7/1972 | Collins et al. |
| 3,691,482 A | 9/1972 | Pinnow et al. |
| 3,709,685 A | 1/1973 | Hercock et al. |
| 3,743,833 A | 7/1973 | Martie et al. |
| 3,763,405 A | 10/1973 | Mitsuhata |
| 3,793,046 A | 2/1974 | Wanmaker et al. |
| 3,819,973 A | 6/1974 | Hosford |
| 3,819,974 A | 6/1974 | Stevenson et al. |
| 3,849,707 A | 11/1974 | Braslau et al. |
| 3,875,456 A | 4/1975 | Kano et al. |
| 3,932,881 A | 1/1976 | Mita et al. |
| 3,937,998 A | 2/1976 | Verstegen et al. |
| 3,972,717 A | 8/1976 | Wiedemann |
| 4,047,075 A | 9/1977 | Schoberl |
| 4,081,764 A | 3/1978 | Christmann et al. |
| 4,104,076 A | 8/1978 | Pons |
| 4,143,394 A | 3/1979 | Schoeberl |
| 4,176,294 A | 11/1979 | Thornton, Jr. |
| 4,176,299 A | 11/1979 | Thornton |
| 4,211,955 A | 7/1980 | Ray |
| 4,305,019 A | 12/1981 | Graff et al. |
| 4,315,192 A | 2/1982 | Skwirut et al. |
| 4,443,532 A | 4/1984 | Joy et al. |
| 4,559,470 A | 12/1985 | Murakami et al. |
| 4,573,766 A | 3/1986 | Bournay, Jr. et al. |
| 4,618,555 A | 10/1986 | Suzuki et al. |
| 4,638,214 A | 1/1987 | Beers et al. |
| 4,667,036 A | 5/1987 | Iden et al. |
| 4,678,285 A | 7/1987 | Ohta et al. |
| 4,727,003 A | 2/1988 | Ohseto et al. |
| 4,772,885 A | 9/1988 | Uehara et al. |
| 4,845,223 A | 7/1989 | Seybold et al. |
| 4,859,539 A | 8/1989 | Tomko et al. |
| 4,915,478 A | 4/1990 | Lenko et al. |
| 4,918,497 A | 4/1990 | Edmond |
| 4,946,621 A | 8/1990 | Fouassier et al. |
| 4,992,704 A | 2/1991 | Stinson |
| 5,077,161 A | 12/1991 | Law |
| 5,110,931 A | 5/1992 | Dietz et al. |
| 5,126,214 A | 6/1992 | Tokailin et al. |
| 5,131,916 A | 7/1992 | Eichenauer et al. |
| 5,143,433 A | 9/1992 | Farrell |
| 5,143,438 A | 9/1992 | Giddens et al. |
| 5,166,761 A | 11/1992 | Olson et al. |
| 5,208,462 A | 5/1993 | O'Connor et al. |
| 5,210,051 A | 5/1993 | Carter, Jr. |
| 5,211,467 A | 5/1993 | Seder |
| 5,237,182 A | 8/1993 | Kitagawa et al. |
| 5,264,034 A | 11/1993 | Dietz et al. |
| 5,283,425 A | 2/1994 | Imamura |
| 5,369,289 A | 11/1994 | Tamaki et al. |
| 5,405,709 A | 4/1995 | Littman et al. |
| 5,439,971 A | 8/1995 | Hyche |
| 5,518,808 A | 5/1996 | Bruno et al. |
| 5,535,230 A | 7/1996 | Abe |
| 5,557,168 A | 9/1996 | Nakajima et al. |
| 5,563,621 A | 10/1996 | Silsby |
| 5,578,839 A | 11/1996 | Nakamura et al. |
| 5,583,349 A | 12/1996 | Norman et al. |
| 5,585,640 A | 12/1996 | Huston et al. |
| 5,619,356 A | 4/1997 | Kozo et al. |
| 5,660,461 A | 8/1997 | Ignatius et al. |
| 5,677,417 A | 10/1997 | Muellen et al. |
| 5,679,152 A | 10/1997 | Tischler et al. |
| 5,763,901 A | 6/1998 | Komoto et al. |
| 5,770,887 A | 6/1998 | Tadatomo et al. |
| 5,771,039 A | 6/1998 | Ditzik |
| 5,777,350 A | 7/1998 | Nakamura et al. |
| 5,869,199 A | 2/1999 | Kido |
| 5,959,316 A | 9/1999 | Lowery |
| 5,962,971 A | 10/1999 | Chen |
| 5,998,925 A | 12/1999 | Shimizu |
| 6,137,217 A | 10/2000 | Pappalardo et al. |
| 6,340,824 B1 | 1/2002 | Komoto et al. |
| 6,504,301 B1 | 1/2003 | Lowery |
| 6,576,488 B2 | 6/2003 | Collins et al. |
| 6,600,175 B1 | 7/2003 | Baretz et al. |
| 6,642,618 B2 | 11/2003 | Yagi et al. |
| 6,642,652 B2 | 11/2003 | Collins et al. |
| 6,869,812 B1 | 3/2005 | Liu |
| 6,880,238 B1 * | 4/2005 | Kumar et al. ................ 29/730 |
| 7,153,015 B2 | 12/2006 | Brukilacchio |
| 7,311,858 B2 | 12/2007 | Wang |
| 7,390,437 B2 | 6/2008 | Dong |
| 7,479,662 B2 | 1/2009 | Soules et al. |
| 7,575,697 B2 | 8/2009 | Li |
| 7,601,276 B2 | 10/2009 | Li |
| 7,615,795 B2 | 11/2009 | Baretz et al. |
| 7,655,156 B2 | 2/2010 | Cheng |
| RE41,234 E * | 4/2010 | Takahashi et al. ............ 313/501 |
| 7,943,945 B2 | 5/2011 | Baretz et al. |
| 8,405,112 B2 * | 3/2013 | Okazaki ......................... 257/98 |
| 8,436,527 B2 * | 5/2013 | Mitsuishi et al. ............. 313/501 |
| 8,508,116 B2 * | 8/2013 | Negley et al. ................. 313/501 |
| 8,508,126 B1 * | 8/2013 | Morejon .................. F21V 9/16 |
| | | 313/46 |
| 2003/0025449 A1 * | 2/2003 | Rossner ........................ 313/512 |
| 2003/0227249 A1 * | 12/2003 | Mueller et al. ................ 313/491 |
| 2004/0016938 A1 | 1/2004 | Baretz et al. |
| 2005/0244993 A1 * | 11/2005 | Bogner et al. ................... 438/22 |
| 2005/0274967 A1 * | 12/2005 | Martin et al. ................... 257/98 |
| 2006/0012299 A1 * | 1/2006 | Suehiro et al. ................ 313/512 |
| 2006/0049416 A1 | 3/2006 | Baretz et al. |
| 2006/0054915 A1 * | 3/2006 | Chang .................. H01L 33/642 |
| | | 257/100 |
| 2006/0158090 A1 | 7/2006 | Wang |
| 2008/0054279 A1 * | 3/2008 | Hussell et al. .................. 257/95 |
| 2008/0111472 A1 | 5/2008 | Liu |
| 2008/0224597 A1 | 9/2008 | Baretz et al. |
| 2008/0224598 A1 | 9/2008 | Baretz et al. |
| 2009/0027872 A1 | 1/2009 | Debije et al. |
| 2009/0206352 A1 * | 8/2009 | Becker et al. ................... 257/98 |
| 2009/0295265 A1 * | 12/2009 | Tabuchi .................. H01L 33/56 |
| | | 313/112 |
| 2010/0052504 A1 * | 3/2010 | Sato et al. ...................... 313/483 |
| 2010/0123151 A1 * | 5/2010 | Hata et al. ....................... 257/98 |
| 2010/0148196 A1 * | 6/2010 | Kamada .................. F21K 9/00 |
| | | 257/98 |
| 2010/0163914 A1 * | 7/2010 | Urano .................... H01L 33/52 |
| | | 257/98 |
| 2010/0247893 A1 * | 9/2010 | Zimmerman ................ 428/292.1 |
| 2010/0264448 A1 * | 10/2010 | Choi et al. ....................... 257/98 |
| 2010/0265692 A1 | 10/2010 | Willemsen et al. |
| 2011/0069490 A1 | 3/2011 | Liu |
| 2011/0149549 A1 | 6/2011 | Miyake |
| 2011/0284904 A1 * | 11/2011 | Okazaki ......................... 257/98 |
| 2012/0217396 A1 * | 8/2012 | Demskie ...................... 250/338.1 |
| 2012/0268936 A1 * | 10/2012 | Pickard et al. ............ 362/249.02 |
| 2012/0287602 A1 * | 11/2012 | Urano .................... F21V 29/763 |
| | | 362/84 |
| 2013/0056725 A1 * | 3/2013 | Eberhardt et al. .............. 257/43 |
| 2013/0119280 A1 * | 5/2013 | Fuchi ........................ C03C 8/22 |
| | | 250/504 R |
| 2013/0207674 A1 * | 8/2013 | Hahl et al. ..................... 324/672 |
| 2013/0250983 A1 * | 9/2013 | Essaian et al. .................. 372/22 |

FOREIGN PATENT DOCUMENTS

| | | |
|---|---|---|
| JP | S50-79379 | 11/1973 |
| JP | 60170194 | 9/1985 |

(56) References Cited

FOREIGN PATENT DOCUMENTS

| | | |
|---|---|---|
| JP | 862-189770 | 8/1987 |
| JP | H01-1794 71 | 7/1989 |
| JP | 01-260707 | 10/1989 |
| JP | H02-91980 | 3/1990 |
| JP | H3-24692 | 3/1991 |
| JP | 4010665 | 1/1992 |
| JP | 4010666 | 1/1992 |
| JP | 04-289691 | 10/1992 |
| JP | 4-321280 | 11/1992 |
| JP | 05-152609 | 6/1993 |
| JP | 6207170 | 7/1994 |
| JP | 6-267301 | 9/1994 |
| JP | 6283755 | 10/1994 |
| JP | 07-099345 | 4/1995 |
| JP | H07-176794 | 7/1995 |
| JP | 07-235207 | 9/1995 |
| JP | H7-282609 | 10/1995 |
| JP | H08-7614 | 1/1996 |
| JP | 8-250281 | 9/1996 |
| JP | 2900928 | 3/1999 |
| JP | P2003-234513 | 8/2003 |
| JP | P3724490 | 9/2005 |
| JP | P3724498 | 9/2005 |
| KR | 10-2010-0127284 A | 12/2010 |
| WO | WO 9108508 | 6/1991 |
| WO | 2010074963 A1 | 1/2010 |

OTHER PUBLICATIONS

Adachi, C. et al., "Blue light-emitting organic electroluminescent devices", "Appl. Phys. Lett.", Feb. 26, 1990, pp. 799-801, vol. 56, No. 9.
Akasaki, Isamu, et al., "Photoluminescence of Mg-doped p-type GaN and electroluminescence of GaN p-n junction LED", "Journal of Luminescence", Jan.-Feb. 1991, pp. 666-670, vol. 48-49 pt. 2.
Amano, H., et al., "UV and blue electroluminescence from Al/GaN:Mg/GaN LED treated with low-energy electron beam irradiation (LEEBI)", "Institute of Physics: Conference Series", 1990, pp. 725-730, vol. 106, No. 10.
Apr. 14, 2010 Office Action in U.S. Appl. No. 11/264,124.
Apr. 15, 2009 Office Action in U.S. Appl. No. 11/264,124, issued by Abu I Kalam.
Armaroli, N. et al., "Supramolecular Photochemistry and Photophysics.", "J. Am. Chern. Soc.", 1994, pp. 5211-5217, vol. 116.
Aug. 21, 2006 Office Action in U.S. Appl. No. 10/623,198, issued by Thao X. Le.
Aug. 24, 2007 Office Action in U.S. Appl. No. 11/264,124, issued by Thao X. Le.
Aug. 26, 2010 Office Action in U.S. Appl. No. 12/131,118.
Berggren, M. et al., "Light-emitting diodes with variable colours from polymer blends", "Nature", Dec. 1, 1994, pp. 444-446, vol. 372.
Berggren, M., et al., "White light from an electroluminescent diode made from poly[3(4-octylphenyl)-2,2'-bithiophene] and an oxadiazole . . . ", "Journal of Applied Physics", Dec. 1994, pp. 7530-7534, vol. 76, No. 11.
Boonkosum, W. et al., "Novel Flat Panel display made of amorphous SiN:H/SiC:H thin film LED", "Physical Concepts and Materials for Novel Optoelectronic Device Applications II", 1993, pp. 40-51, vol. 1985.
Bradfield, P.L., et al., "Electroluminescence from sulfur impurities in a p-n junction formed in epitaxial silicon", "Appl. Phys. Lett", 07110/ 1989, pp. •10D-102, vol. 55, No. 2.
Chao, Zhang Jin, et al., "White light emitting glasses", "Journal of Solid State Chemistry", 1991, pp. 17-29, vol. 93.
Comrie, M., "Full Color LED Added to Lumex's Lineup", "EBN", Jun. 19, 1995, p. 28.
CRC Handbook, 63rd Ed., (1983) p. E-201.
Das, N.C., et al., "Luminescence spectra of ann-channel metal-oxide-semiconductor field-effect transistor at breakdown", 1990, pp. 1152-1153, vol. 56, No. 12.

Dec. 16, 2004 Office Action in U.S. Appl. No. 10/623,198, issued by Thao X. Le.
Dictionary Definition of Phosphor, Oxford English Dictionary Online, Mar. 9, 2012 (Only partial available due to corrupt file as provided on Mar. 22, 2012 in U.S. Appl. No. 12/131,119; Request for Full Reference filed).
El Jouhari, N., et al., "White light generation using fluorescent glasses activated by Ce3+, Tb3+ and Mn2+ ions", "Journal De Physique IV, Colloque C2", Oct. 1992, pp. 257-260, vol. 2.
Feb. 21, 2012 Office Action in U.S. Appl. 12/131,118, issued by Abul Kalam.
Feb. 26, 2008 Office Action in U.S. Appl. No. 11/264,124, issued by Abu I Kalam.
Feb. 4, 2005 Office Action in U.S. Appl. No. 10/623,198, issued by Thao X. Le.
Feb. 7, 2007 Office Action in U.S. Appl. No. 11/264,124, issued by Thao X. Le.
Forrest, S. et al., "Organic emitters promise a new generation of displays", "Laser Focus World ", Feb. 1995, pp. 99-107.
Hamada, Y. et al., "Blue-Light-Emitting Organic Electroluminescent Devices with Oxadiazole Dimer Dyes as an Emitter", "Jpn. J. Appl. Physics", Jun. 1992, pp. 1812-1816, vol. 31.
Hamakawa, Yoshihiro, et al., "Toward a visible light display by amorphous SiC:H alloy system", "Optoelectronics—Devices and Technologies", Dec. 1989, pp. 281-294, vol. 4, No. 2.
Hirano, Masao, et al., "Various performances of fiber-optical temperature sensor utilizing infrared-to-visible conversion phosphor", "Electrochemisty (JP)", Feb. 1987, pp. 158-164, vol. 55, No. 2, Publisher: Electrochemical Society of Japan.
Jang, S., "Effect of Avalanche-Induced Light Emission on the Multiplication Factor in Bipolar Junction Transistors", "Solid-State Electronics", 1991, pp. 1191-1196, vol. 34, No. 11.
Jan. 29, 2007 Office Action in U.S. Appl. No. 10/623,198, issued by Thao X. Le.
Jan. 30, 2006 Office Action in U.S. Appl. No. 11/264,124, issued by Thao X. Le.
Jan. 7, 2011 Office Action in U.S. Appl. No. 12/131,119, issued by Steven Y. Horikoshi.
Jul. 10, 2008 Office Action in U.S. Appl. No. 11/264,124, issued by Abu I Kalam.
Jul. 14, 2005 Notice of Allowance, Notice of Allowability, and Examiner's Statement of Reasons for Allowance in U.S. Appl. No. 10/623,198, issued by Thao X. Le.
Jul. 14, 2011 Office Action in U.S. Appl. No. 12/131,119, issued by Steve Horikoshi.
Jul. 7, 2011 Office Action in U.S. Appl. No. 12/131,118, issued by Abu I Kalam.
Jun. 14, 2006 Office Action in U.S. Appl. No. 11/264,124, issued by Thao X. Le.
Jun. 26, 2007 Office Action in U.S. Appl. No. 10/623,198, issued by Thao X. Le.
Kido, J. et al., "1,2,4-Triazole Derivative as an Electron Transport Layer in Organic Luminescent Devices", "Jpn. J. Appl. Phys.", Jul. 1, 1993, pp. L917-L920, vol. 32.
Kido, J. et al., "Bright blue electroluminescence from poly(N-vinylcarbazole)", "Appl. Phys. Letters", Nov. 8, 1993, pp. 2627-2629, vol. 63, No. 19.
Kido, J., et al., "White light-emitting organic electroluminescent devices using the poly(N-vinylcarbazole) emitter layer doped with . . . ", "Appl. Phys. Lett.", Feb. 14, 1994, pp. 815-817, vol. 64, No. 7.
Krames, M., et al., "Status and Future of High-Power Light-Emitting Diodes for Solid-Slate Lighting", "Journal of Display Technology", Jun. 2007, pp. 160-175, vol. 3, No. 2.
Kudryashov, V., et al., "Spectra of Superbright Blue and Green InGaN/AlGaN/GaN Light-Emitting diodes", "Journal of the European Ceramic Society", May 1996, pp. 2033-2037, vol. 17.
Larach, S., et al., "Blue emitting luminescent phosphors: Review and status", "Int'l Workshop on Electroluminescence", 1990, pp. 137-143.
LEDs and Laser Diodes, Electus Distribution, copyright 2001, available at URL:http://www.jaycar.com.au/images_uploaded/ledlaser.Pdf.

(56) References Cited

OTHER PUBLICATIONS

Lester, S., et al., "High dislocation densities in high efficiency GaN-based light-emitting diodes", "Appl. Phys. Lett.", Mar. 6, 1995, pp. 1249-1251, vol. 66, No. 10.
Lumogen® F Violet 570 Data Sheet; available at the BASF Chemical Company website Lumogen® F Violet 570 Data Sheet; available at the BASF Chemical Company website URL,http://worldaccount.basf.com/wa/EUen_GB/Catalog/Pigments/doc4/BASF/PRD/30048274/.pdf?title=Technicai%20Datasheet&asset_type=pds/pdf&language=EN&urn=urn: documentum:eCommerce_soi_EU :09007bb280021e27.pdf:09007bb280021e27.pdf.
Mar. 2, 2009 Office Action in U.S. Appl. No. 10/623,198, issued by Abu I Kalam.
Mar. 22, 2012 Office Action in U.S. Appl. No. 12/131,119, issued by Steven Y. Horikoshi.
Mar. 28, 2006 Office Action in U.S. Appl. No. 10/623,198, issued by Thao X. Le.
Mar. 4, 2011 Notice of Allowance, Notice of Allowability, Examiner's Interview Summary, Examiner's Amendment/Comment and Examiner's Statement of Reason for Allowance in U.S. Appl. No. 11/264,124, issued by Abu I Kalam.
Mar. 7, 2008 Office Action in U.S. Appl. No. 10/623,198, issued by Abu I Kalam.
Maruska, H.P., "Gallium nitride light-emitting diodes (dissertation)", "Dissertation Submitted to Stanford University", Nov. 1973.
Maruska, H.P., et al., "Violet luminescence of Mg-doped GaN", "Appl. Phys. Lett.", Mar. 15, 1973, pp. 303-305, vol. 22, No. 6.
May 4, 2010 Office Action in U.S. Appl. No. 12/131,119.
McGraw-Hill, "McGraw-Hill Dictionary of Scientific and Technical Terms, Third Edition", "McGraw-Hill Dictionary of Scientific and Technical Terms", 1984, pp. 912 and 1446, Publisher: McGraw-Hill.
McGraw-Hill, "McGraw-Hill Encyclopedia of Science and Technology, Sixth Edition", "McGraw-Hill Encyclopedia of Science and Technology", 1987, pp. 582 and 60-63, vol. 9-10, Publisher: McGraw-Hill.
Mimura, Hidenori, et al., "Visible electroluminescence from uc-SiC/porous Si/c-Si p-n junctions", "Int. J. Optoelectron.", 1994, pp. 211-215, vol. 9, No. 2.
Miura, Noboru, et al., "Several Blue-Emitting Thin-Film Electroluminescent Devices", "Jpn. J. Appl. Phys.", Jan. 15, 1992, pp. L46-L48, vol. 31, No. Part 2, No. 1A IB.
Morkoc et al., "Large-band-gap SIC, 111-V nitride, and II-VI ZnSe-based semiconductor device technologies", J. Appl. Phys. 76(3), 1; Mar. 17, 1994; Illinois University.
Muench, W.V., et al., "Silicon carbide light-emitting diodes with epitaxial junctions", "Solid-State Electronics", Oct. 1976, pp. 871-874, vol. 19, No. 10.
Mukai, T., et al., "Recent progress of nitride-based light emitting devices", "Phys. Stat. Sol.", Sep. 2003, pp. 52-57, vol. 200, No. 1.
Nakamura, S., et al., "High-power InGaN single-quantum-well-structure blue and violet light-emitting diodes", "Appl. Phys. Lett.", Sep. 25, 1995, pp. 1868-1870, vol. 67, No. 13.
Nakamura, S., et al., "The Blue Laser Diode: GaN Based Light Emitters and Lasers", Mar. 21, 1997, p. 239, Publisher: Springer-Verlag.
Nakamura, S., et al., "The Blue Laser Diode: The Complete Story, 2nd Revised and Enlarged Edition", Oct. 2000, pp. 237-240, Publisher: Springer-Verlag.
Nov. 30, 2010 Office Action in U.S. Appl. No. 12/131,118.
Oct. 20, 2008 Office Action in U.S. Appl. No. 10/623,198, issued by Abu I Kalam.
Pankove, J.I., et al., "Scanning electron microscopy studies of GaN", "Journal of Applied Physics", Apr. 1975, pp. 1647-1652, vol. 46, No. 4.
Pavan, P., et al., "Explanation of Current Crowding Phenomena Induced by Impact Ionization in Advanced Si Bipolar Transistors by Means of . . . ", "Microelectronic Engineering", 1992, pp. 699-702, vol. 19.
Pei, Q, et al., "Polymer Light-Emitting Electrochemical Cells", "Science", Aug. 25, 1995, pp. 1086-1088, vol. 269, No. 5227.
Reexam Advisory Action dated Sep. 28, 2012 for U.S. Appl. No. 90/010,940.
Reexam Final Office Action dated May 24, 2012 for U.S. Appl. No. 90/010,940.
Reexam Final Office Action dated Nov. 7, 2011 for U.S. Appl. No. 90/010,940.
Reexam Non-Final Office Action dated Jan. 26, 2012 for U.S. Appl. No. 90/010,940.
Reexam Non-Final Office Action dated Mar. 3, 2011 for U.S. Appl. No. 90/010,940.
Reexam Non-Final Office Action dated Sep. 20, 2010 for U.S. Appl. No. 90/010,940.
Roman. D., "LEDs Turn a Brighter Blue", "Electronic Buyers' News", Jun. 19, 1995, pp. 28 and 35, vol. 960, Publisher: CMP Media LLC.
Saleh and Teich, Fundamentals of Photonics, New York: John Wiley & Sons, 1991, pp. 592-594.
Sato, Yuichi, et al., "Full-color fluorescent display devices using a near-UV light-emitting diode", "Japanese Journal of Applied Physics", Jul. 1996, pp. L838-L839, vol. 35, No. ?A.
Sep. 17, 2009 Notice of Allowance, Notice of Allowability, Examiner's Amendmeni/Comment, and Examiner's Statement of Reasons for Allowance in U.S. Appl. No. 10/623,198, issued by Abul Kalam.
Sep. 29, 2009 Office Action in U.S. Appl. No. 11/264,124, issued by Abu I Kalam.
Tanaka, Shosaku, et al., "Bright white-light electroluminescence based on nonradiative energy transfer in Ce-and Eu-doped SrS thin films", "Applied Physics Letters", Nov. 23, 1987, pp. 1661-1663, vol. 51, No. 21.
Tanaka, Shosaku, et al., "White Light Emitting Thin-Film Electroluminescent Devices with SrS:Ce,Cl/ZnS:Mn Double Phosphor Layers", "Jpn. J. Appl. Phys.", Mar. 20, 1986, pp. L225-L227, vol. 25, No. 3.
The Penguin Dictionary of Electronics, 3rd edition, pp. 315,437-438, 509-510, copyright 1979, 1988, and 1998.
Ura, M. , "Recent trends of development of silicon monocarbide blue-light emission diodes", "Kinzoku", 1989, pp. 11-15, vol. 59, No. 9.
Werner, K. , "Higher Visibility for LEDs", "IEEE Spectrum", Jul. 1994, pp. 30-39.
Wojciechowski, J. et al. , "Infrared-To-Blue Up-Converting Phosphor", "Electron Technology", 1978, pp. 31-47, vol. 11, No. 3.
Yamaguchi, Y. et al., "High-Brightness SiC Blue LEDs and Their Application to Full Color LED Lamps", "Optoelectronics-Devices and Technologies", Jun. 1992, pp. 57-67, vol. 7, No. 1.
Yang, Y., et al., "Voltage controlled two color light-emitting electrochemical cells", "Appl. Phys. Lett.", 1996, vol. 68, No. 19.
Yoshimi, Masashi, et al., "Amorphous carbon basis blue light electroluminescent device", "Optoelectronics—Devices and Technologies", Jun. 1992, pp. 69-81, vol. 7, No. 1.
Zanoni, E., et al., "Impact ionization, recombination, and visible light emission in ALGaAs/GaAs high electron mobility transistors", "J. Appl. Phys.", 1991, pp. 529-531, vol. 70, No. 1.
Zanoni, E., et al., "Measurements of Avalanche Effects and Light Emission in Advanced Si and SiGe Bipolar Transistors", "Microelectronic Engineering", 1991, pp. 23-26, vol. 15.
Zdanowski, Marek, "Pulse operating up-converting phosphor LED", "Electron Technol.", 1978, pp. 49-61, vol. 11, No. 3.
Zhiming, Chen, et al., "Amorphous thin film white-LED and its light-emitting mechanism", "Conference Record of the 1991 International Display Research Conference", Oct. 1991, pp. 122-125.
International Search Report and Written Opinion dated Oct. 8, 2013 for PCT Appln. No. PCT/US2012/058550.

* cited by examiner

WAVELENGTH CONVERSION COMPONENT HAVING PHOTO-LUMINESCENCE MATERIAL EMBEDDED INTO A HERMETIC MATERIAL FOR REMOTE WAVELENGTH CONVERSION

FIELD

This invention relates to light emitting devices that utilize remote wavelength conversion, and particularly to apparatuses and methods for implementing a wavelength conversion component for a light emitting device which includes photo-luminescent material embedded within a hermetic material.

BACKGROUND

White light emitting LEDs ("white LEDs") are known and are a relatively recent innovation. It was not until LEDs emitting in the blue/ultraviolet part of the electromagnetic spectrum were developed that it became practical to develop white light sources based on LEDs. As taught, for example, in U.S. Pat. No. 5,998,925, white LEDs include one or more phosphor materials, that is photo-luminescent materials, which absorb a portion of the radiation emitted by the LED and re-emit light of a different color (wavelength). Typically, the LED chip or die generates blue light and the phosphor(s) absorbs a percentage of the blue light and re-emits yellow light or a combination of green and red light, green and yellow light, green and orange or yellow and red light. The portion of the blue light generated by the LED that is not absorbed by the phosphor material combined with the light emitted by the phosphor provides light which appears to the eye as being nearly white in color.

The phosphor typically resides within a wavelength conversion layer, in which phosphor material formed is mixed with a light transmissive carrier material, typically a plastics material. The wavelength conversion layer is operable to absorb a proportion of the blue light generated by the LEDs and convert it to light of a different wavelength by a process of photoluminescence. The combination of the different wavelength light produced by the phosphor-based wavelength conversion layer (e.g., yellow light) combined with the residue blue light that passes through the wavelength conversion layer forms light that appears white to the human eye.

A problem with existing wavelength conversion components is the degradation of the wavelength conversion layer when exposed to external environmental conditions. As noted above, the wavelength conversion layer is typically composed of a mixture of a phosphor material and a plastics carrier material. When the plastic-based wavelength conversion layer is exposed to moisture (e.g., mixture of air and water), oxygen, or other environmental contaminants, light energy being absorbed by the wavelength conversion layer may cause the contaminants to initiate chemical reactions with the phosphor material leading to accelerated degradation of the wavelength conversion layer.

The effect of water absorption on photoluminescence varies between phosphor compositions and can be more pronounced for silicate-based phosphor materials which are able to more readily form water soluble compounds. The absorption of water can occur even when the phosphor material is encapsulated in a polymer binder (e.g., carrier material/binding material), such as silicone, and a reduction in light emission of ~10% may occur for a device with an ortho-silicate phosphor that is operated in a humid environment (i.e. ≥80% relative humidity) at a temperature of 25° C. for more than 200 hours.

Moreover, an exposed wavelength conversion layer may be prone to handling damage, such as surface scratches, which also degrade the performance and lifetime of the wavelength conversion layer over time.

Therefore, there is a need for an improved approach to implement photo-luminescent materials for a lighting apparatus which addresses these and other problems with the prior implementations.

SUMMARY

Embodiments of the invention concern wavelength conversion components for remote wavelength conversion. In some embodiments, the wavelength conversion component includes a wavelength conversion layer comprising photo-luminescent material embedded within a hermetic material. Some embodiments are directed to phosphor material embedded within glass. The phosphor-embedded glass is utilized as a remote wavelength conversion component for an LED lighting apparatus.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

In order that the present invention is better understood light emitting devices and wavelength conversion components in accordance with the invention will now be described, by way of example only, with reference to the accompanying drawings in which like reference numerals are used to denote like parts, and in which.

DETAILED DESCRIPTION

Figure 1:
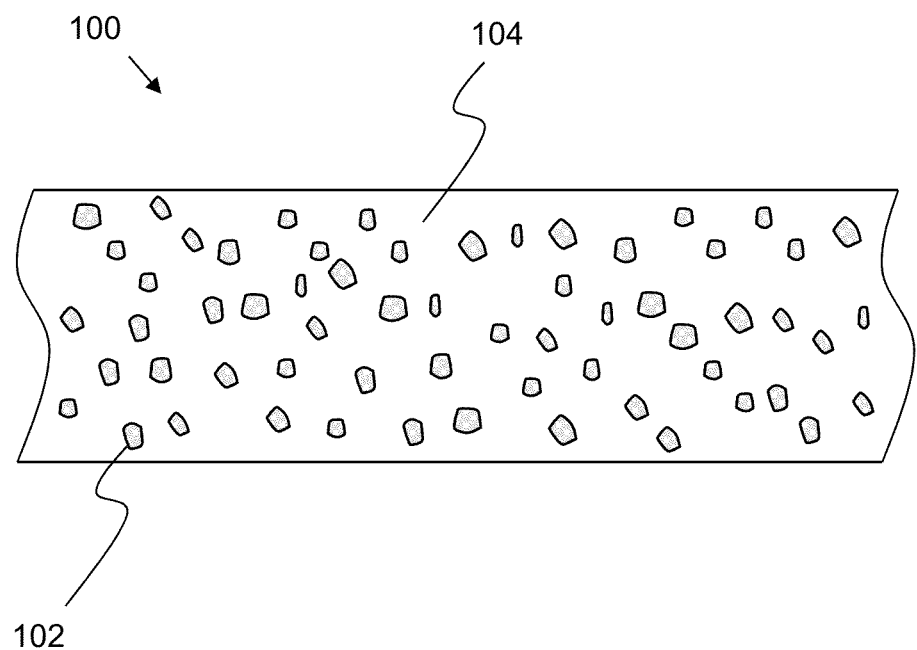
FIG. 1 illustrates a cross-sectional view of a wavelength conversion component having photo-luminescent materials embedded in a hermetic material according to some embodiments.

Various embodiments are described hereinafter with reference to the figures. It should be noted that the figures are not drawn to scale and that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

For the purposes of illustration only, the following description is made with reference to photo-luminescent materials embodied specifically as phosphor materials. However, the invention is applicable to any type of photo-luminescent material, such as either phosphor materials or quantum dots. A quantum dot is a portion of matter (e.g. semiconductor) whose excitons are confined in all three spatial dimensions that may be excited by radiation energy to emit light of a particular wavelength or range of wavelengths. As such, the invention is not limited to phosphor based wavelength conversion components unless claimed as such.

Embodiments of the invention are directed to wavelength conversion components for remote wavelength conversion, in which the wavelength conversion component includes a wavelength conversion layer comprising photo-luminescent material embedded within a hermetic material. In some embodiments, phosphor materials are embedded within glass to form a phosphor-embedded glass layer. For purposes of explanation, the present disclosure will describe embodiments of the invention specifically with reference to wavelength conversion components formed of phosphor embedded within glass. It is noted, however, that the invention is not limited only to these materials, and indeed, other types of photo-luminescent and hermetic materials may be utilized within the scope and spirit of the disclosure. As a result, the invention is not to be limited to the example embodiments unless claimed as such.

According to some embodiments, phosphor-embedded glass is utilized as a remote wavelength conversion component for an LED lighting apparatus. In this way, the glass provides a covering that makes the phosphor impervious to exposure to external contaminants. Moreover, the glass that is formed around the phosphor provides a protective shield against handling damage. Additionally, the glass acts as a UV filter, blocking UV light that may potentially damage the phosphor. As a result, the LED lighting apparatus is very durable and operates much more effectively as compared to prior approaches that utilize relatively porous plastic as the carrier materials and/or substrate for the phosphor.

FIG. 1 illustrates a wavelength conversion layer 100 having a layer of an amorphous hermetic material 104 that is substantially transmissive to light in the visible spectrum (e.g., 380-740 nm). At such wavelengths, the amorphous hermetic material 104 should ideally be able to transmit at least 90% of visible light. The amorphous hermetic material 104 should be "hermetic", being substantially impermeable to water, gas, or other environmental contaminants. Examples of amorphous hermetic materials includes an inorganic materials such as glass (e.g., traditional, borosilicate, tempered) and sapphire.

Embedded and distributed within the amorphous hermetic material 104 are photo-luminescent materials 102. The photo-luminescent materials 102 absorb light of a first wavelength and convert it to light of a different wavelength by a process of photoluminescence. In some embodiments, the photo-luminescent materials 102 comprise phosphor materials.

Figure 2:
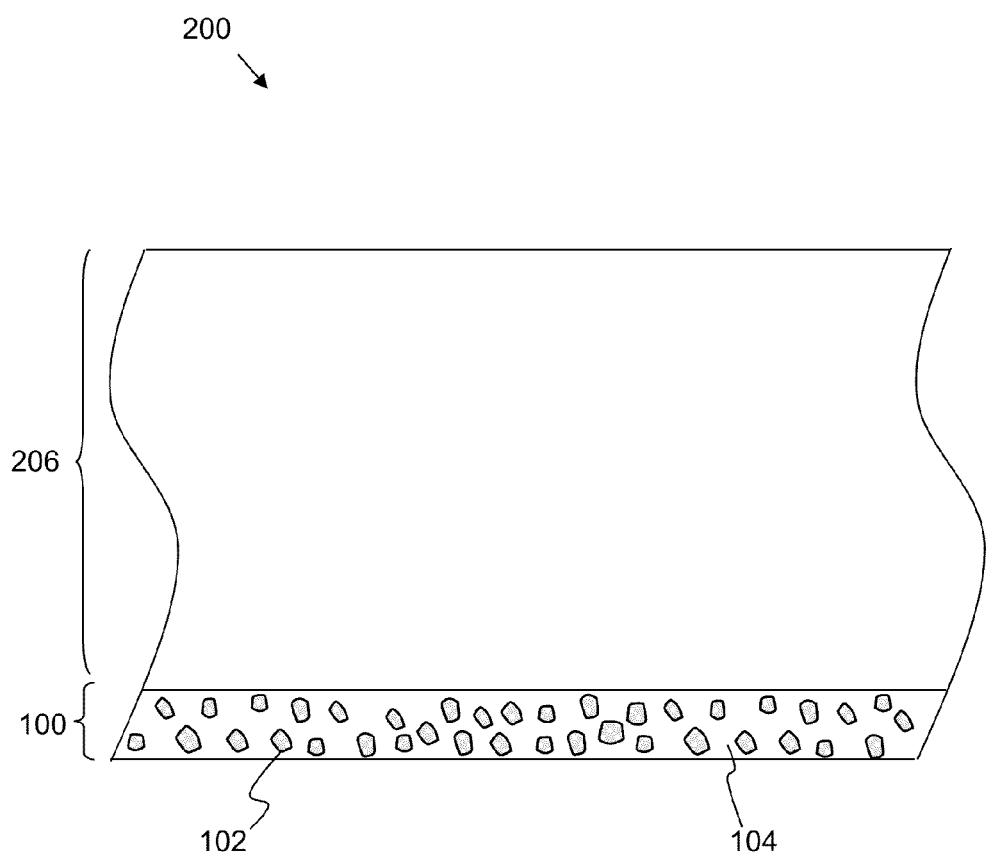
FIG. 2 illustrates a cross-sectional view of a wavelength conversion component of phosphor embedded glass on a substrate material according to some embodiments.

As shown in FIG. 2, a wavelength conversion component 200 may include the wavelength conversion layer 100 disposed on a light transmissive substrate 206. The light transmissive substrate 206 can be any material that is substantially transmissive to light, e.g., in a wavelength range 380 nm to 740 nm. As described in more detail below, the light transmissive substrate 206 provides a base onto which the wavelength conversion layer 100 may be formed during the manufacturing process of firing the glass material 104. As such, the light transmissive substrate 206 should be selected to withstand the environmental conditions under which the wavelength conversion layer 100 is manufactured, without appreciable and/or detrimental degradation in the light transmissive property of the light transmissive substrate 206.

Furthermore, the light transmissive substrate 206 and the wavelength conversion layer 100 should have substantially similar index of refractions in order to ensure proper transmission of light through the wavelength conversion component 200. The light transmissive substrate 206 and the wavelength conversion layer 100 may also be composed of different materials, albeit with substantially similar indices of refraction.

Additionally, the light transmissive substrate 206 and the wavelength conversion layer 100 should have substantially similar coefficients of thermal expansion. At high operating temperatures, the wavelength conversion component 200 may experience structural degradation if there are mismatched coefficients of thermal expansion between the light transmissive substrate 206 and the wavelength conversion layer 100. Thus, maintaining substantially similar coefficients of thermal expansion between light transmissive substrate 206 and the wavelength conversion layer 100 will help preserve the structural integrity of the wavelength conversion component 200.

In some embodiments, the light transmissive substrate 206 and the wavelength conversion layer 100 may be composed of the same glass material. This is to ensure a match between the light transmissive substrate 206 and the wavelength conversion layer 100 with respect to their indices of refraction, coefficients of thermal expansion, and heat handling properties. In other embodiments, the light transmissive substrate 206 and the wavelength conversion layer 100 may be composed of different materials with substantially similar indices of refraction and coefficients of thermal expansion.

Figure 3A:
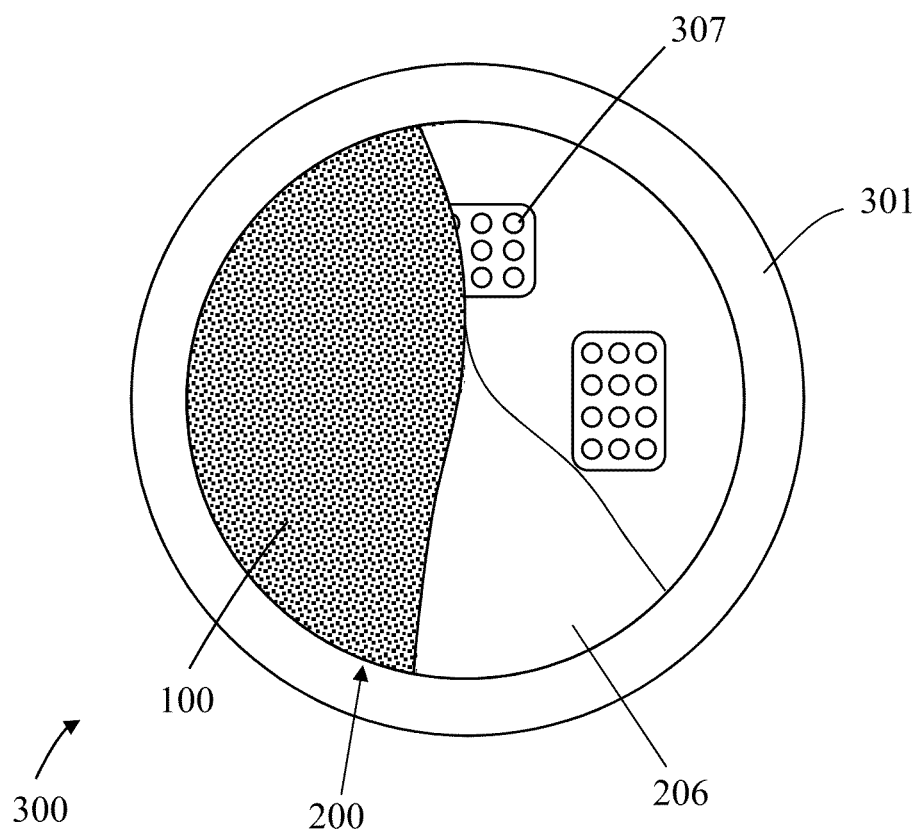
FIG. 3A illustrates a schematic partial cutaway plan and sectional views of a light emitting device that utilizes remote wavelength conversion with phosphor embedded glass according to some embodiments.

An example light emitting device that utilizes remote wavelength conversion with phosphor-embedded glass will now be described with reference to FIGS. 3A and 3B. FIG. 3A shows a schematic partial cutaway plan and sectional views of the light emitting device 300. The device 300 may comprise a hollow cylindrical body 301 with a base 303 and sidewalls 305. The device 300 may further comprise a plurality of blue light emitting LEDs (blue LEDs) 307 that are mounted to the base 303 of the device 300. The LEDs 307 may be configured in various arrangements.

The device 300 further comprises a wavelength conversion component 200 that is operable to absorb a proportion of the blue light ($\lambda_1$) generated by the LEDs 307 and convert it to light of a different wavelength ($\lambda_2$) by a process of photoluminescence. The emission product of the device 300 comprises the combined light of wavelengths $\lambda_1$, $\lambda_2$ generated by the LEDs and the phosphor wavelength conversion component. The wavelength conversion component is positioned remotely to the LEDs 307 and is spatially separated from the LEDs a distance that is typically at least 1 cm. In this patent specification "remotely" and "remote" means in a spaced or separated relationship.

The wavelength conversion component 200 comprises a light transmissive substrate 206 and a wavelength conversion layer 100, where the wavelength conversion layer 100 comprises phosphor-embedded glass. In some embodiments, the wavelength conversion component 200 may be shaped as a planar circular disc. In other embodiments, the wavelength conversion component 200 may comprise other geometries such as being convex or concave in form such as for example being dome shaped or cylindrical.

Figure 3B:
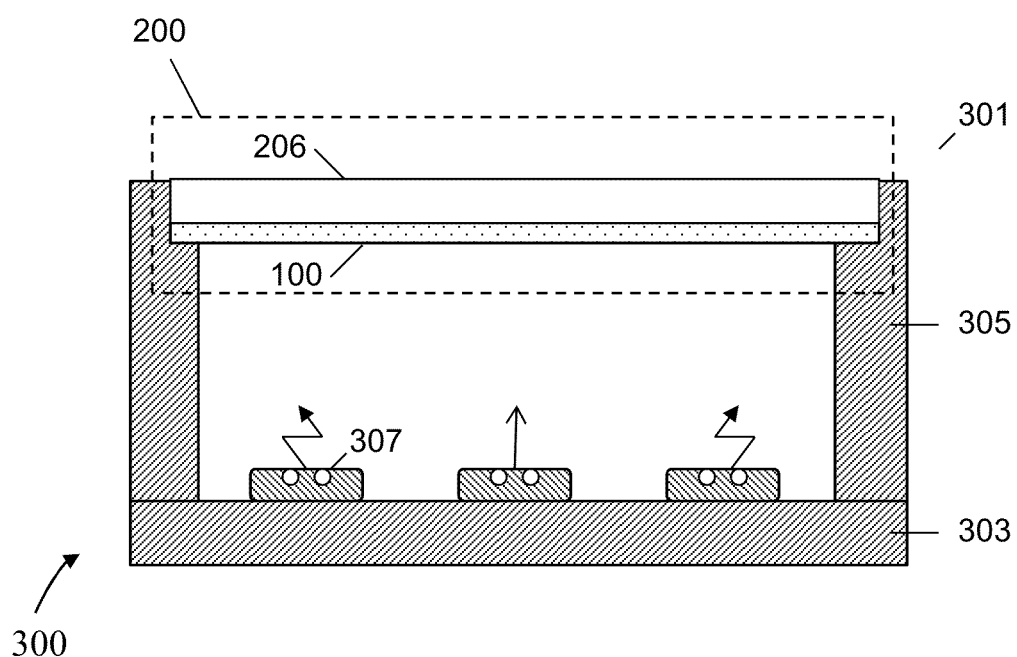
FIG. 3B illustrates a cross-sectional view of a wavelength conversion component with phosphor embedded glass according to some embodiments.

FIG. 3B illustrates a cross-sectional view of the light emitting device 300. The wavelength conversion component 200 of FIG. 3B may be configured such that the wavelength conversion layer 100 is facing the LEDs 307. Alternatively, the wavelength conversion component 200 may be configured such that the light transmissive substrate 206 is facing the LEDs 307.

For a wavelength conversion layer 100 comprising phosphor material, the phosphor material may comprise an inorganic or organic phosphor such as for example silicate-based phosphor of a general composition $A_3Si(O,D)_5$ or $A_2Si(O,D)_4$ in which Si is silicon, O is oxygen, A comprises strontium (Sr), barium (Ba), magnesium (Mg) or calcium (Ca) and D comprises chlorine (Cl), fluorine (F), nitrogen (N) or sulfur (S). Examples of silicate-based phosphors are disclosed in U.S. Pat. No. 7,575,697 B2 "Silicate-based green phosphors", U.S. Pat. No. 7,601,276 B2 "Two phase silicate-based yellow phosphors", U.S. Pat. No. 7,655,156 B2 "Silicate-based orange phosphors", and U.S. Pat. No. 7,311,858 B2 "Silicate-based yellow-green phosphors". The phosphor can also comprise an aluminate-based material such as is taught in co-pending patent application US2006/0158090 A1 "Novel aluminate-based green phosphors" and U.S. Pat. No. 7,390,437 B2 "Aluminate-based blue phosphors", an aluminum-silicate phosphor as taught in co-pending application US2008/0111472 A1 "Aluminum-silicate orange-red phosphor" or a nitride-based red phosphor material such as is taught in our co-pending United States patent application US2009/0283721 A1 "Nitride-based red phosphors" and International patent application WO2010/074963 A1 "Nitride-based red-emitting in RGB (red-green-blue) lighting systems". It will be appreciated that the phosphor material is not limited to the examples described and can comprise any phosphor material including nitride and/or sulfate phosphor materials, oxy-nitrides and oxy-sulfate phosphors or garnet materials (YAG).

The wavelength conversion component 200 having the wavelength conversion layer 100 composed of phosphor embedded into glass provides numerous advantages. For example, the glass surrounds and protects the phosphor from exposure to environmental contaminants. This limits the potential of such environmental contaminants to potentially initiate chemical reactions that leads to accelerated degradation of the phosphor. The exposure of the phosphor to moisture (e.g., the mixture of air and gas) significantly increases the potential for accelerated degradation of the phosphor. Thus, the glass provides a barrier against exposure to moisture by eliminating the introduction of water into the phosphor. Additionally, the surrounding glass protects against handling damage, such as surface scratches to phosphor materials, which also degrade the performance and lifetime of the wavelength conversion layer over time. Furthermore, the glass may be configured to act as a UV filter, thereby blocking UV light that may potentially damage the phosphor.

Figure 4A:
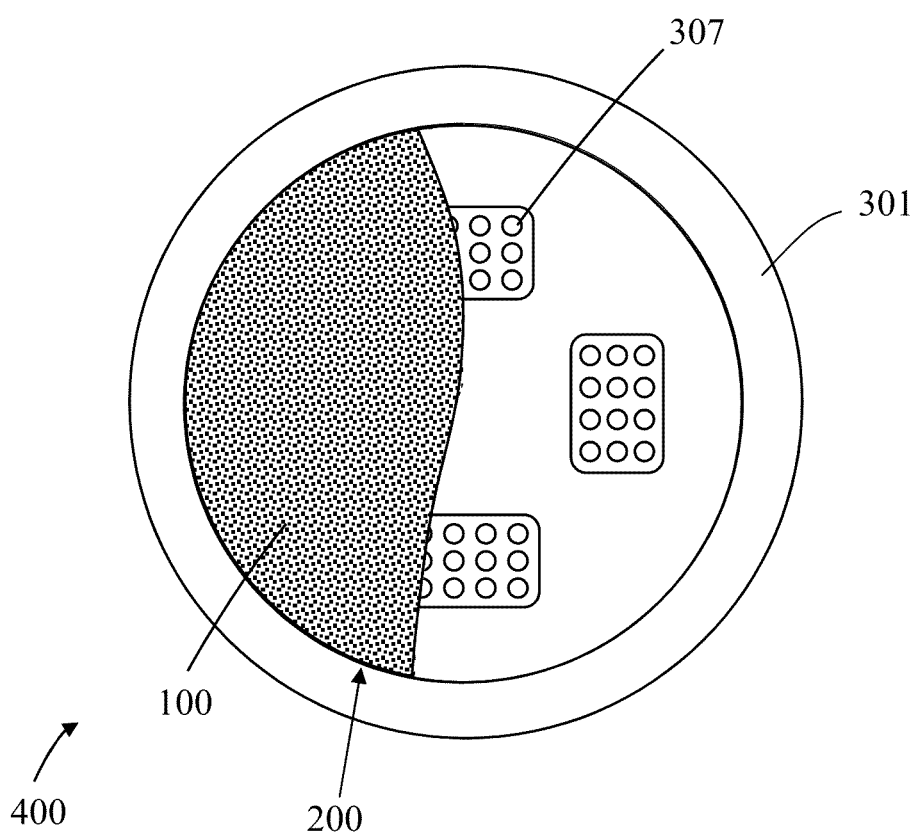
FIG. 4A illustrates a schematic partial cutaway plan and sectional views of an alternate light emitting device that utilizes remote wavelength conversion with phosphor embedded glass according to some embodiments.
Figure 4B:
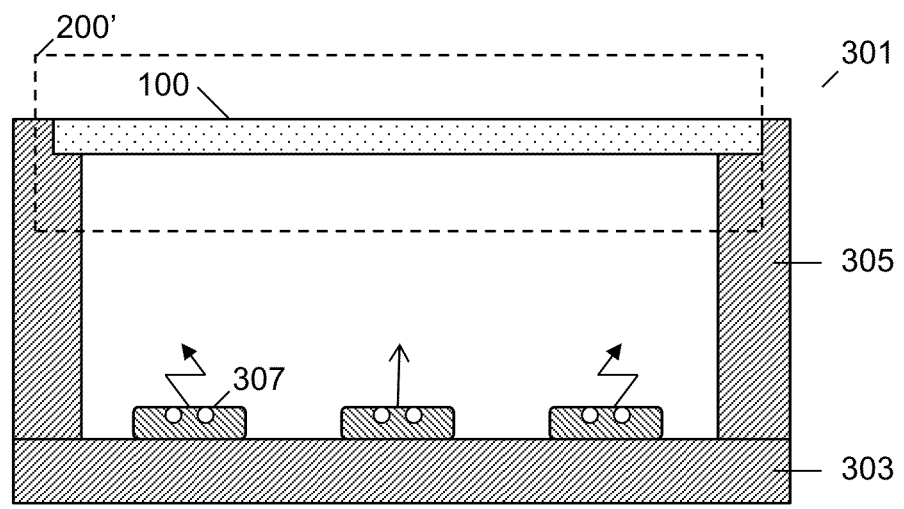
FIG. 4B illustrates a cross-sectional view of an alternate wavelength conversion component with phosphor embedded glass according to some embodiments.

An alternative light emitting device 400 that utilizes remote wavelength conversion with phosphor-embedded glass will now be described with reference to FIGS. 4A and 4B. FIG. 4A shows a schematic partial cutaway plan and sectional views of the light emitting device 400. Like the device 300 illustrated in FIG. 3A, device 400 comprises a hollow cylindrical body 301 with a base 303 and sidewalls 305, along with a plurality of blue LEDs 307 that are mounted to the base 303 of the device 400. Device 400 also includes a wavelength conversion component 200' that is operable to absorb a proportion of the blue light generated by the LEDs 307 and convert it to light of a different wavelength by a process of photoluminescence, where the wavelength conversion component 200' is positioned remotely to the LEDs 307.

However, the wavelength conversion component 200' of FIG. 4A only includes a wavelength conversion layer 100 of phosphor-embedded glass, without the wavelength conversion layer 100 being affixed to a light transmissive substrate. FIG. 4B illustrates a cross-sectional view of the light emitting device 400. From this cross-sectional view, it can clearly be seen that the wavelength conversion component 200' comprises a wavelength conversion layer 100, without the wavelength conversion layer 100 being affixed to a light transmissive substrate as disclosed for the embodiment of FIGS. 3A-B.

Figure 5:
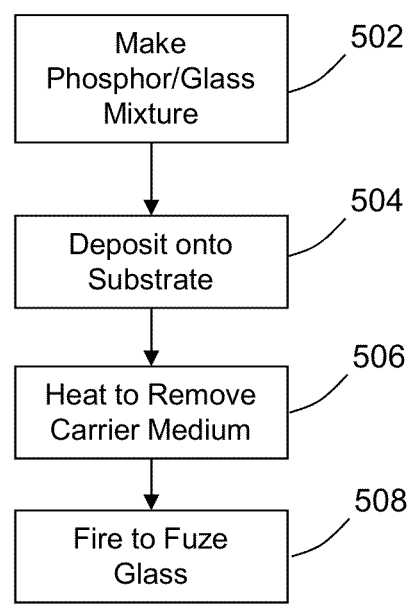
FIG. 5 is a flow diagram illustrating a method of manufacturing a wavelength conversion component in accordance with some embodiments of the present invention.

Several methods exist for manufacturing a wavelength conversion component in accordance with the embodiments described above. FIG. 5 is a flowchart illustrating a method of manufacturing a wavelength conversion component in accordance with an embodiment in which the wavelength conversion component comprises both a glass-based light transmissive substrate and a phosphor-embedded glass wavelength conversion layer.

Initially, a phosphor and glass mixture is created (502). The phosphor and glass mixture includes a glass material that can be used to form glass. The glass material can be in any suitable form. For example, either glass fits or powdered glass may be employed to create the phosphor and glass mixture.

Such glass materials are "vitreous" (e.g., keeps its transparent, amorphous structure after curing)

The type of glass to be selected must be sufficiently optically transparent to permit its use in a light emitting device. Therefore, only frits/powders for amorphous glass can be utilized in the present embodiment of the invention. In addition, the selected type of glass should be manufacturable at relatively lower temperatures levels. This is because most phosphor materials will undergo damaging chemical changes at higher temperature levels. Thus, to increase the pool of candidate phosphors that may be employed, the glass should be selected to correspond to as low a temperature as possible that would be needed to fire the glass, subject to the glass having acceptable optical properties. In some embodiments, the glass should have a firing temperature in the range of 400-500 degrees C., and preferably be below 600 degrees C. There are many types of glass materials that may be suitably employed in embodiments of the present invention. For example, many types of boron or zinc based glass compositions may suitably be used in embodiments of the invention.

Since the glass and phosphor mixture will undergo a heating process to form the final glass product, the type of phosphor that is selected should be sufficiently heat resistant to handle the necessary firing temperatures. There are many types of YAG and nitride based phosphor materials that may be suitably employed in embodiments of the present invention, including at least some of the phosphor materials described above.

The mixture of phosphor and glass material is placed into a fluidic carrier medium, e.g., an organic liquid medium. The carrier medium is selected to have an evaporative temperature sufficiently low such that it can be removed at less than the firing temperature of the glass material. In some embodiments, the carrier medium comprises a fluid composed of ethylene glycol. In an alternative embodiment, glycerol may be employed as the carrier medium.

Additives may be introduced into the glass/phosphor mixture for various reasons. For example, additives may be introduced to adjust the viscosity of the mixture, e.g., to ensure that the phosphor and glass are properly suspended in the mixture rather than sinking to the bottom. In addition, a flux may be introduced to assist fusion of the glass materials during firing. Agents may also be added to promote the hermetic properties of the glass. Certain types of metals may also be introduced to lower the firing temperature of the glass. The mixture may undergo a mixing procedure to ensure proper distribution of the phosphor and glass materials within the carrier medium.

The glass/phosphor mixture is then deposited onto a light transmissive substrate (504). As previous noted, the glass material of the light transmissive substrate should have substantially similar index of refractions as compared to the glass of the glass-phosphor mixture. This is to ensure proper transmission of light through the final product. In addition, the light transmissive substrate and the glass of the glass-phosphor mixture should have substantially similar coefficients of thermal expansion. This is to avoid problems during high operating temperatures for the light device. Finally, the substrate material should be sufficiently heat resistant such that it can withstand the firing temperatures of the glass/phosphor mixture. In some embodiments, the same type of glass is selected for both the substrate material and the glass of the glass/phosphor mixture.

Any suitable mechanism can be taken to deposit the glass/phosphor mixture onto the substrate. In some embodiments, screen printing is employed to deposit the glass/phosphor mixture onto the substrate. Other deposition techniques may also be employed, such as slot die coating, spin coating, or doctor blading.

Smaller particle sizes may be selected for the phosphor and glass materials to facilitate dispersal and even distribution of the phosphor and glass within the carrier medium, and to facilitate dispensing and deposition on the substrate. For example, in some embodiments, the size of the particles of the phosphor and glass materials that are placed in the mixture is smaller than 20 microns in size.

Next, a baking process is employed to remove the carrier medium from the glass/phosphor mixture (506). This baking process encompasses a sufficient baking time period and temperature to cause the evaporative removal of the carrier medium. In some embodiments, when using a carrier medium composed of ethylene glycol or glycerol, the baking process is performed at a temperature of at least 120 degrees C. and for a time period of 0.5 to 2 hours.

Firing is them performed to fuze the glass in the glass/phosphor mixture (508). This action converts the glass material into actual glass. Since the glass material was mixed with the phosphor, the final glass product will include the phosphor particles suspended in the glass. The firing process will also cause the newly formed phosphor-embedded glass layer to adhese to the underlying glass substrate.

The firing process encompasses a sufficiently long enough firing time period and sufficiently high enough firing temperature to cause the appropriate fuzing of the glass material, but should be a low enough temperature and time period to avoid damage to the phosphor material. In some embodiments, the firing process is performed for a time period of approximately 0.5 hours at a firing temperature of less than 600 degrees C.

The manufacturing environment may need to be configured to account for the specific type of phosphor that is being embedded within the glass layer. For example, consider if nitride based phosphors are employed to make the phosphor embedded glass. In this situation, the glass manufacturing process may need to occur in an inert gas environment to prevent damage to the phosphor material. In contrast, a YAG based phosphor material may require the presence of oxygen in the manufacturing environment.

Figure 6:
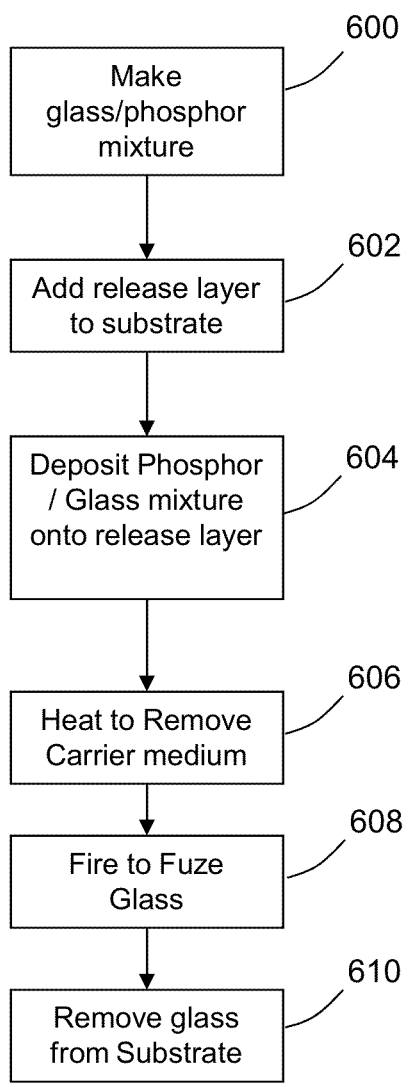
FIG. 6 is a flow diagram illustrating an alternate method of manufacturing a wavelength conversion component in accordance with some embodiments of the present invention.

FIG. 6 is a flowchart illustrating an alternative method of manufacturing a wavelength conversion component in accordance with an embodiment in which the wavelength conversion component comprises only a phosphor-embedded glass wavelength conversion layer, and does not include a light transmissive substrate. The principle difference between this manufacturing process and the process described above is that even though the glass will be formed onto a substrate material, the end result of this process is to remove the newly formed glass layer from the underlying substrate.

As described in the previous process, the glass/phosphor mixture is similarly prepared for deposition (600). The glass/phosphor mixture will include a suitable carrier medium to hold the glass and phosphor materials in a suspended state.

A significant difference between this process and the previously described process pertains to the selection of the substrate material. In the previous process of FIG. 5, the selected substrate material was required to have certain optical properties (e.g., the substrate must be amorphous) since that substrate material will eventually be in a light transmission path when installed in the light emitting device. In the current process, the substrate material will eventually be separated from the phosphor-embedded glass layer and will not exist in the final device. Therefore, the substrate material does not need to be selected to have any particular optical properties. Instead, the substrate material can be selected based on characteristics that permit easier separation of the glass from the substrate. In some embodiments, the substrate material is stainless steel, which provides adequate resistance to chemical adhesion from the newly formed glass layer.

Before deposition onto a substrate, the substrate material undergoes a preparation process to ensure that the glass to be formed can be more easily removed from the substrate (602). Here, the substrate will first be prepared to be as adhesion-resistant as possible. A cleaning/polishing step may be performed at this point. In addition, a release material may be deposited onto the substrate. In some embodiment, Teflon may be employed as the release material that is deposited onto the substrate.

Next, the glass/phosphor mixture is deposited onto the substrate, or on top of the layer of release material that is on the substrate (604). Any suitable deposition process may be employed to deposit the glass/phosphor mixture onto the substrate. For example, a screen printing process may be employed to deposit the glass/phosphor mixture onto the substrate.

A baking process is than performed to remove the carrier medium (606). Next, firing is performed to fuze the glass material to form the glass layer that is embedded with phosphor (608). Each of these actions may be performed similarly to the steps described above with respect to FIG. 5.

At this point, a newly formed glass layer exists on the substrate. The glass layer is not directly on top of the substrate, but was instead formed above the layer of release material that had previously been deposited onto the substrate. Therefore, the glass layer would not have adhered to the substrate. As such, the glass layer can readily be removed from the substrate at this time (610), e.g., by carefully applying sufficient pressure to separate the glass layer from the substrate.

While FIG. 6 describes a method of manufacturing a wavelength conversion component using a substrate, in alternative embodiments, the method of manufacturing a wavelength conversion component may involve using a mold (e.g., 3-D shape) to deposit the glass/phosphor mixture without the need to include a carrier medium in the glass/phosphor mixture in order to hold the glass and phosphor materials in a suspended state.

Likewise, while FIG. 6 describe a method of manufacturing a wavelength conversion component using a glass material such as a glass powder/frit, in alternative embodiments, the method of manufacturing a wavelength conversion component may involve using a glass material such as a glass precursor (e.g., fluid) that reduces and becomes glass at high temperatures. In such alternative embodiments, the glass/phosphor may still include a suitable carrier medium to hold the glass and phosphor materials in a suspended state.

Figure 7:
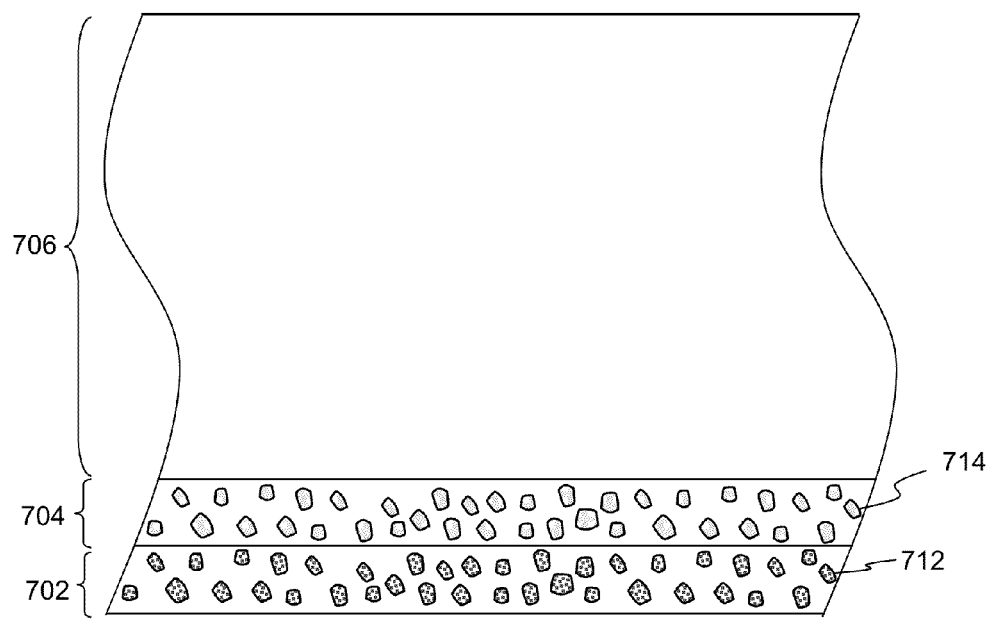
FIG. 7 illustrates a cross-sectional view of a wavelength conversion component having multiple layers of phosphor embedded glass according to some embodiments.

FIG. 7 illustrates another embodiment of the invention in which the wavelength conversion component 700 includes multiple wavelength conversion layers 702 and 704 that are disposed on a light transmissive substrate 706. Each of the wavelength conversion layers 702 and 704 are glass layers that include embedded phosphor particles 712 and 714, respectively.

The reason for including multiple wavelength conversion layers 702 and 704 in the wavelength conversion component 700 is because it may be desirable to include different properties for the phosphor materials in the different wavelength conversion layers 702 and 704, e.g., where phosphor material 712 is different from the phosphor material 714 in type, quantity, color, size, temperature, and/or composition. For example, it may be desirable to utilize one of the wavelength conversion layers to implement red-colored photoluminescence and to utilize the other wavelength conversion layer to implement green-colored photoluminescence.

Figure 8:
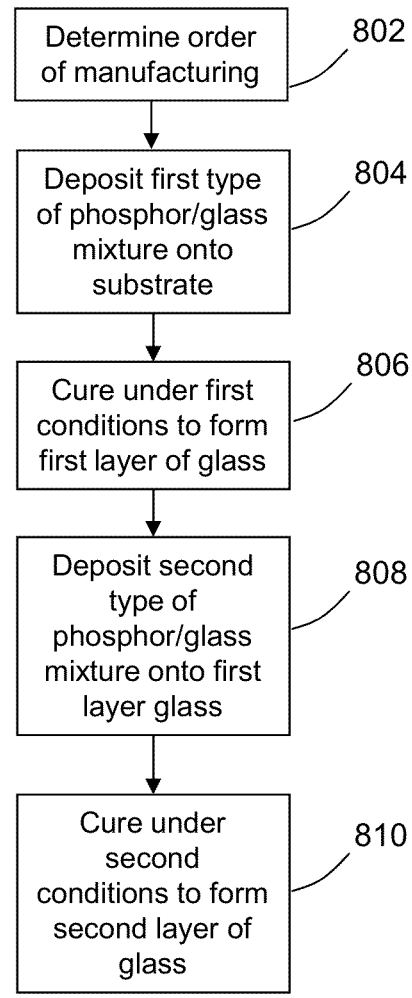
FIG. 8 is a flow diagram illustrating a method of manufacturing the wavelength conversion component of FIG. 7 in accordance with some embodiments of the present invention.

FIG. 8 shows a flowchart of steps that may be taken to manufacture a wavelength conversion component having multiple wavelength conversion layers. The first step is to determine a sequence in which the different layers should be manufactured (802). The general idea is that different types of phosphor materials may correspond to different manufacturing properties and constraints. As a result, it may be important to establish an appropriate ordering of manufacturing steps as between the different phosphor layers.

For example, certain types of phosphor materials may be more fragile as compared to other types of phosphor materials. Therefore, the less fragile phosphor material may need to be deposited and formed into a glass layer first, followed by the deposition and formation of the more fragile phosphor material into a second layer. In this way, it is the less fragile phosphor material that has to undergo two rounds of heat-based firing, with the more fragile phosphor materials undergoing only a single round of heat-based firing.

Once an appropriate ordering has been established, the first type of phosphor/glass mixture is deposited onto the substrate (804). Any suitable type of deposition method may be employed, e.g., by using screen printing to deposit the mixture onto the substrate.

Next, the first layer of glass is formed under environmental conditions that are appropriate for the specific type of phosphor that is being embedded within the glass layer (806). For example, if nitride based phosphors are employed to make the phosphor embedded glass, then the glass manufacturing process may need to occur in an inert gas environment. If a YAG based phosphor material is being used, then the presence of oxygen may be needed in the manufacturing environment.

The second type of phosphor/glass mixture is then deposited onto the substrate (808). As before, any suitable type of deposition method may be employed, e.g., by using screen printing to deposit the mixture onto the substrate.

Finally, the second layer of glass is formed under environmental conditions that are appropriate for the specific type of phosphor that is being embedded within the glass layer (810). It is quite possible that the required environmental conditions for the second layer are different from the required environmental conditions for the first layer of glass. For example, it is possible that a YAG based phosphor material was used for the first layer of glass which required the presence of oxygen, whereas a nitride based phosphor is employed for the second layer, which requires an inert gas or nitrogen environment.

Figure 9A:
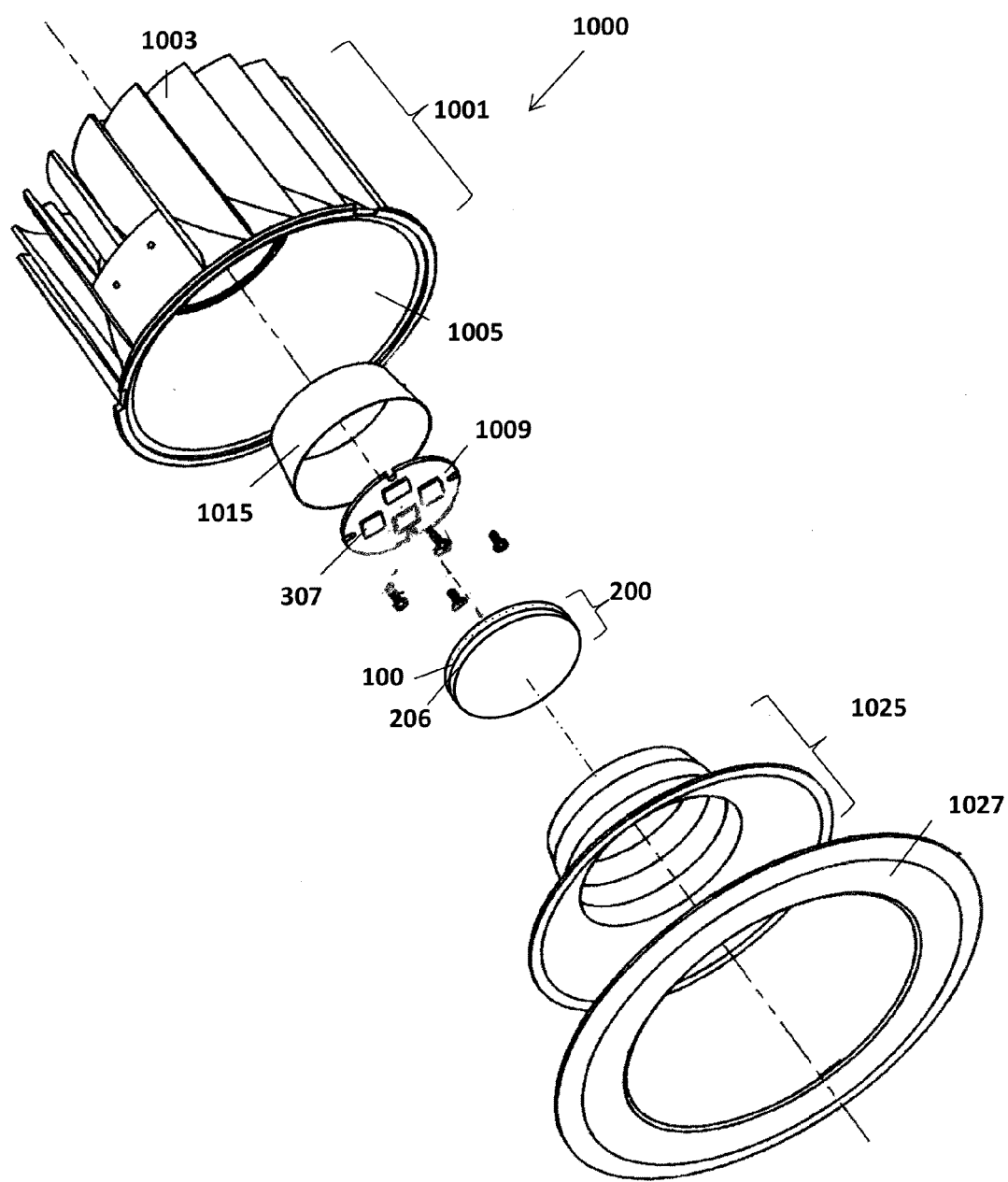
FIGS. 9A, 9B, and 9C illustrate an example of an application of a wavelength conversion component in accordance with some embodiments.
Figure 9B:
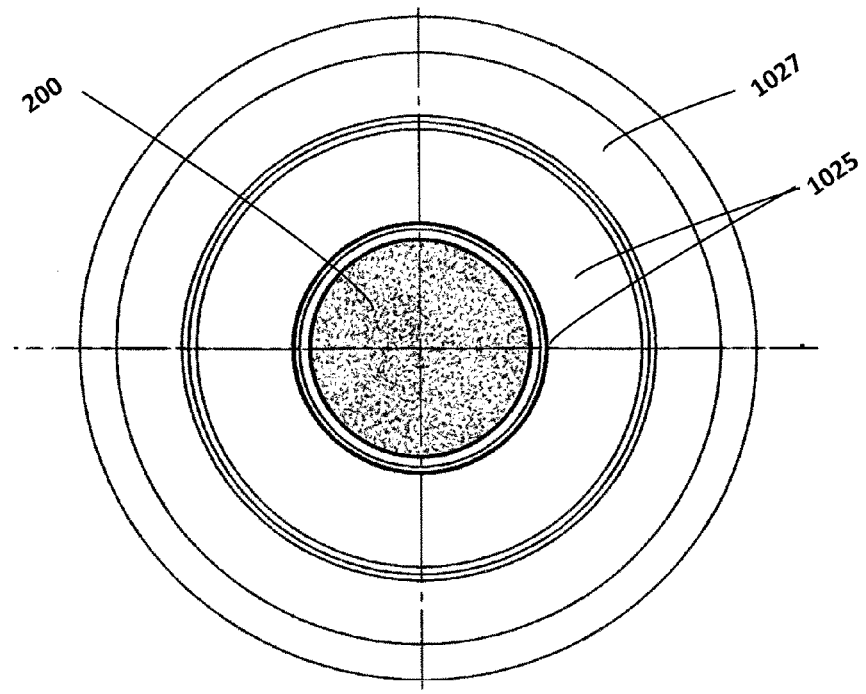
Figure 9C:
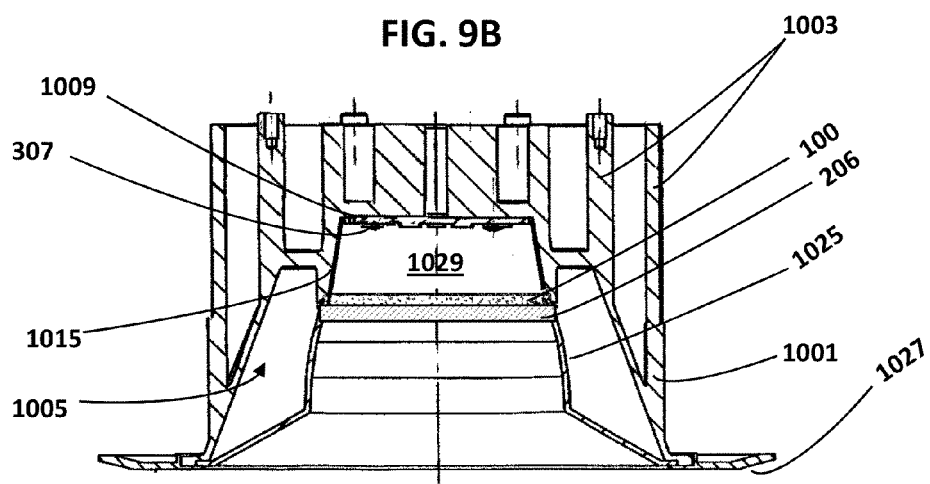

FIGS. 9A, 9B, and 9C illustrate an example of an application of a light emitting device in accordance with some embodiments. FIGS. 9A, 9B, and 9C illustrates an LED downlight 1000 in accordance with some embodiments. FIG. 9A is an exploded perspective view of the LED downlight 1000, FIG. 9B is an end view of the downlight 1000, and FIG. 9C is a sectional view of the downlight 1000. The downlight 1000 is configured to generate light with an emission intensity of 650-700 lumens and a nominal beam spread of 60° (wide flood). It is intended to be used as an energy efficient replacement for a conventional incandescent six inch downlight.

The downlight 1000 comprises a hollow generally cylindrical thermally conductive body 1001 fabricated from, for example, die cast aluminum. The body 1001 functions as a heat sink and dissipates heat generated by the light emitters 307. To increase heat radiation from the downlight 1000 and thereby increase cooling of the light emitting device 1000, the body 1001 can include a series of latitudinal spirally extending heat radiating fins 1003 located towards the base of the body 1001. To further increase the radiation of heat, the outer surface of the body can be treated to increase its emissivity such as for example painted black or anodized. The body 1001 further comprises a generally frustoconical (i.e. a cone whose apex is truncated by a plane that is parallel to the base) axial chamber 1005 that extends from the front of the body a depth of approximately two thirds of the length of the body. The form factor of the body 1001 is configured to enable the downlight to be retrofitted directly in a standard six inch downlighting fixture (can) as are commonly used in the United States.

Four solid state light emitters 307, such as the ones described above in FIG. 3A, may be mounted on a circular shaped MCPCB (Metal Core Printed Circuit Board) 1009. As is known an MCPCB comprises a layered structure composed of a metal core base, typically aluminum, a thermally conducting/electrically insulating dielectric layer and a copper circuit layer for electrically connecting electrical components in a desired circuit configuration. With the aid of a thermally conducting compound such as for example a standard heat sink compound containing beryllium oxide or aluminum nitride the metal core base of the MCPCB 1009 is mounted in thermal communication with the body via the floor of the chamber 1005. As shown in FIG. 9A the MCPCB 1009 can be mechanically fixed to the body floor by one or more screws, bolts or other mechanical fasteners.

The downlight 1000 further comprises a hollow generally cylindrical light reflective chamber wall mask 1015 that surrounds the array of light emitters 307. The chamber wall mask 1015 can be made of a plastics material and preferably has a white or other light reflective finish. A wavelength conversion component 200, such as the one described above in FIG. 2 may be mounted overlying the front of the chamber wall mask 1015 using, for example, an annular steel clip that has resiliently deformable barbs that engage in corresponding apertures in the body. The wavelength conversion component 200 is remote to the light emitters 307. The wavelength conversion component 200 comprises a wavelength conversion layer 100 and a light transmissive substrate 206. The wavelength conversion layer 100 comprises glass embedded with phosphor materials as described above.

The downlight 1000 further comprises a light reflective hood 1025 which is configured to define the selected emission angle (beam spread) of the downlight (i.e. 60° in this example). The hood 1025 comprises a generally cylindrical shell with three contiguous (conjoint) inner light reflective frustoconical surfaces. The hood 1025 is preferably made of Acrylonitrile butadiene styrene (ABS) with a metallization layer. Finally the downlight 1025 can comprise an annular trim (bezel) 1027 that can also be fabricated from ABS.

While the wavelength conversion components described above have two-dimensional configurations (e.g., planar surface), in some other embodiments it is possible for the inventive wavelength conversion component to have a three-dimensional configuration as well. Such three-dimensional components may be useful for applications where it is necessary or desired for light emitted from the light emitting device to be spread over a larger solid angle.

Figure 10A:
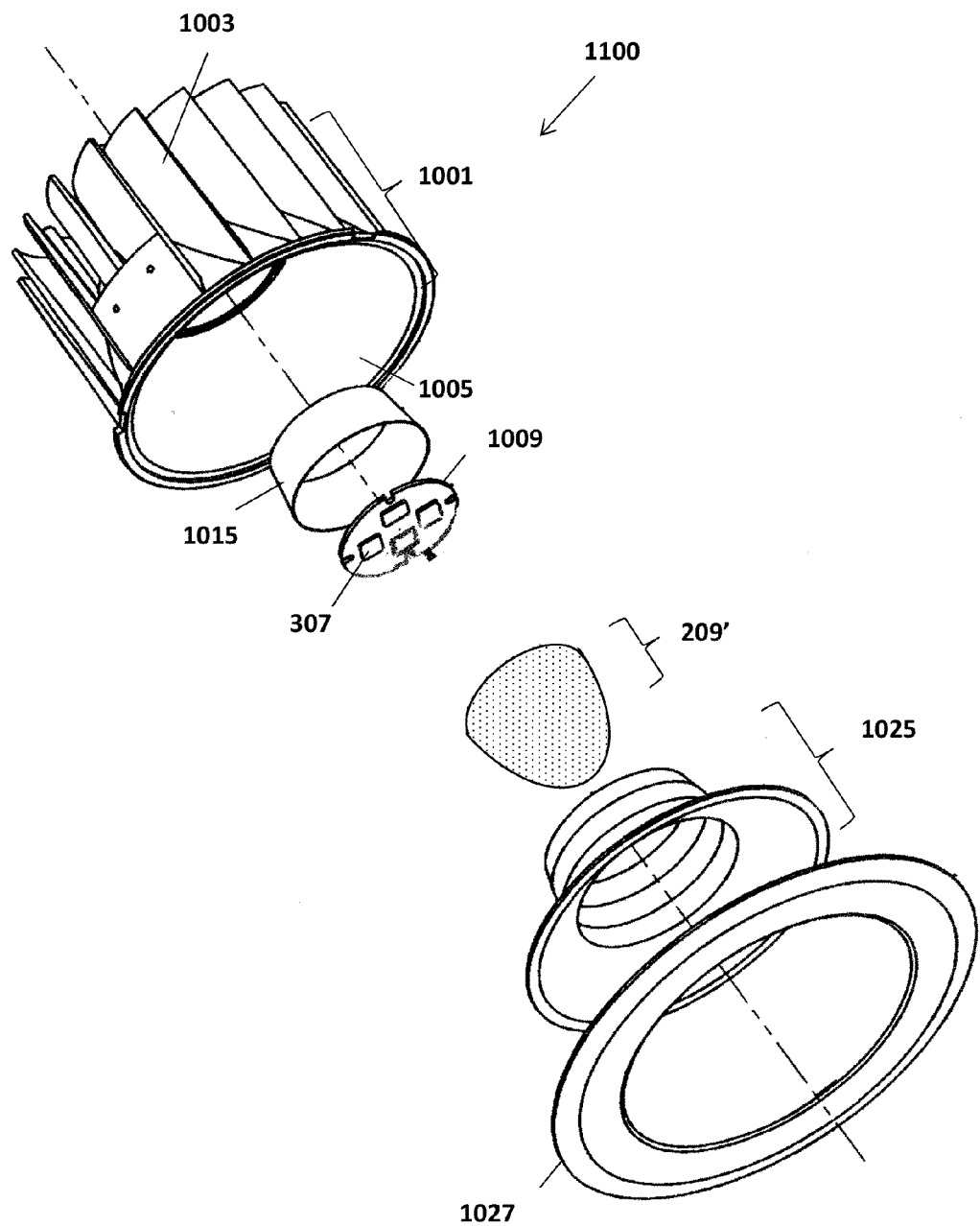
FIGS. 10A, 10B, and 10C illustrate another example of an application of a wavelength conversion component in accordance with some embodiments.
Figure 10B:
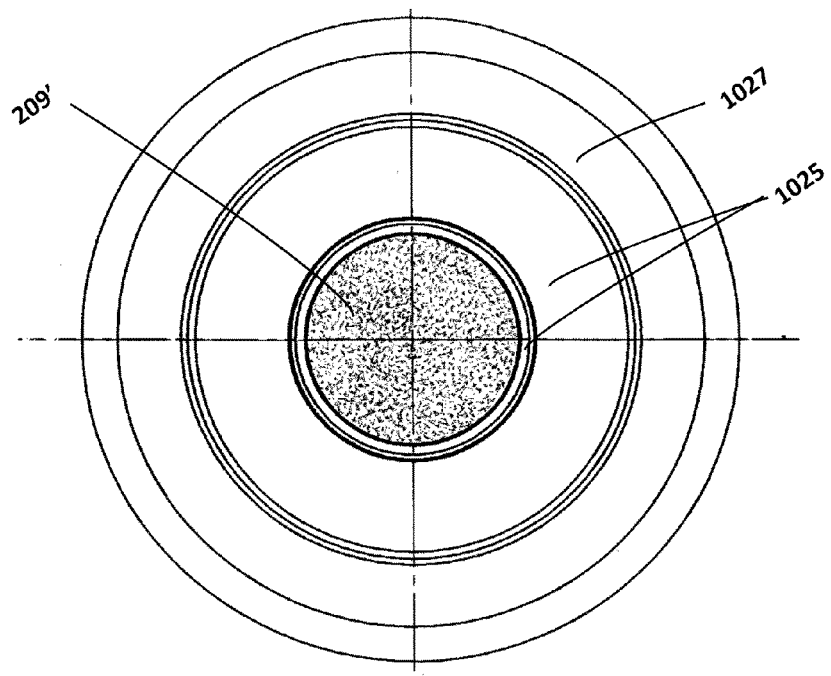
Figure 10C:
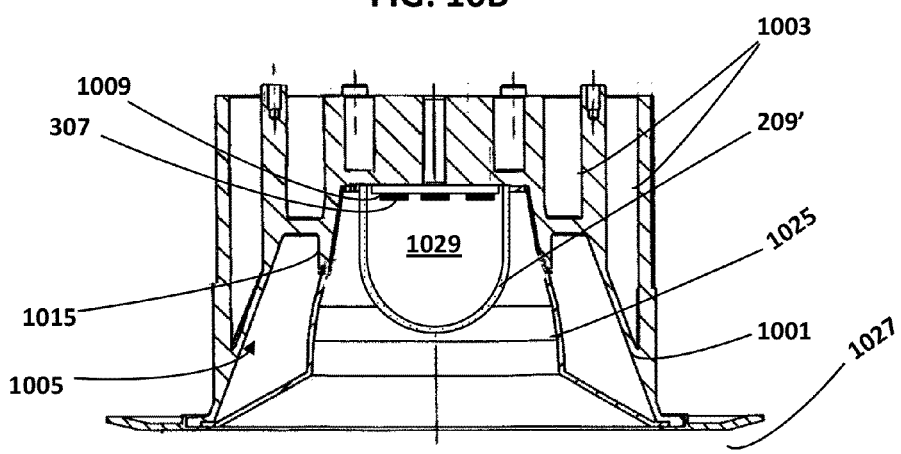

FIGS. 10A, 10B, and 10C illustrate an example of an application of a light emitting device in accordance with some embodiments directed to a three-dimensional shape. FIGS. 10A, 10B, and 10C illustrate an LED downlight 1100 that utilizes remote wavelength conversion in accordance with some embodiments. FIG. 10A is an exploded perspective view of the LED downlight 1100, FIG. 10B is an end view of the downlight 1100, and FIG. 10C is a sectional view of the downlight 1100. The downlight 1100 is configured to generate light with an emission intensity of 650-700 lumens and a nominal beam spread of 60° (wide flood). It is intended to be used as an energy efficient replacement for a conventional incandescent six inch downlight.

The downlight 1100 of FIGS. 10A, 10B, and 10C is substantially the same as the downlight 1000 of FIGS. 9A, 9B, and 9C. For purposes of discussion, only features of the downlight 1100 that are new relative to the embodiments of FIGS. 9A, 9B, and 9C will be described.

Whereas the wavelength conversion component 100 of FIGS. 9A, 9B, and 9C has a two-dimensional shape (e.g., is substantially planar), the wavelength conversion component 209' of FIGS. 10A, 10B, and 10C has a three-dimensional shape (e.g., elongated dome shaped and/or ellipsoidal shell). The three-dimensional wavelength conversion component 209' may comprise a phosphor material embedded within a hermetic material such as glass. The wavelength conversion component 209' may also be mounted enclosing the front of the chamber wall mask 1015.

Figure 11:
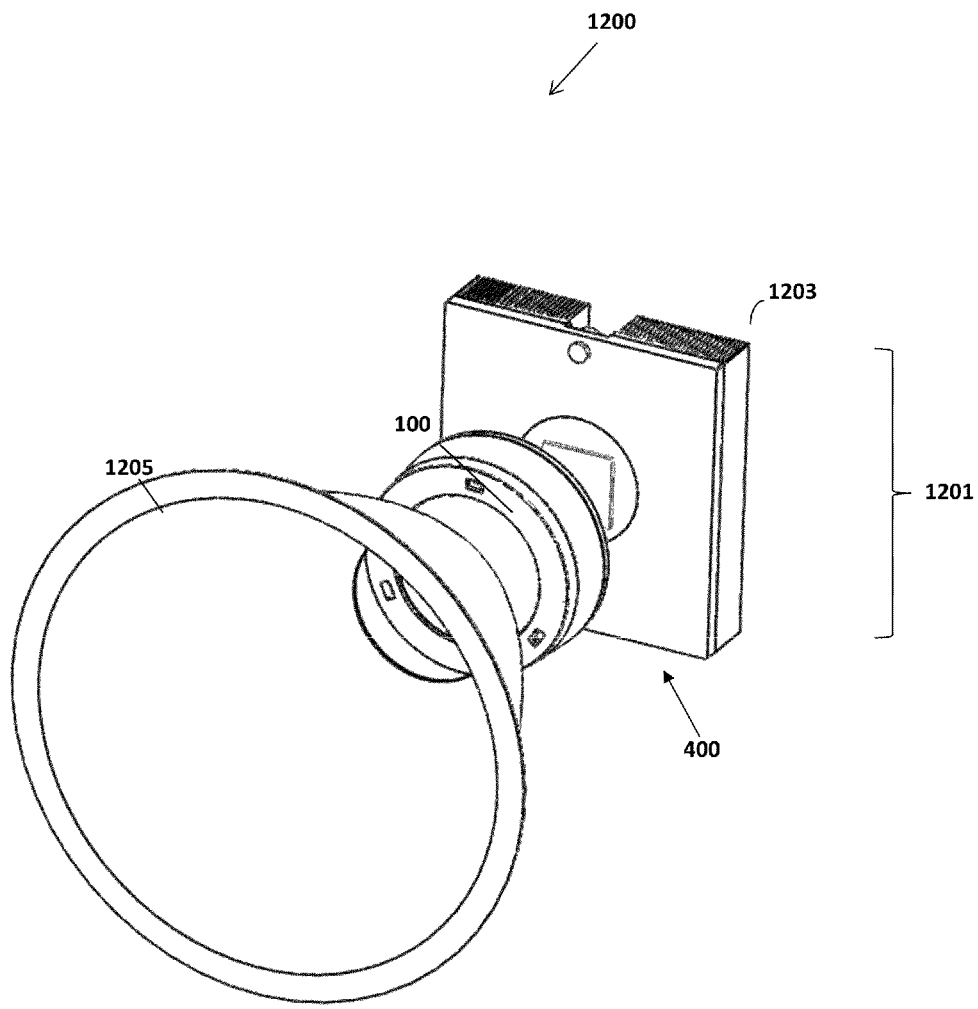
FIG. 11 illustrates another example of an application of a wavelength conversion component in accordance with some embodiments.

FIG. 11 illustrates another example of an application of a light emitting device in accordance with some embodiments. FIG. 11 illustrates an exploded perspective view of a reflector lamp 1200 in accordance with some embodiments. The reflector lamp 1200 is configured to generate light with an emission intensity of 650-700 lumens and a nominal beam spread of 60° (wide flood). It is intended to be used as an energy efficient replacement for a conventional incandescent six inch downlight.

The reflector lamp 1200 comprises a generally rectangular thermally conductive body 1201 fabricated from, for example, die cast aluminum. The body 1201 functions as a heat sink and dissipates heat generated by a light emitting device 400, such as the one described in FIGS. 4A and 4B. To increase heat radiation from the reflector lamp 1200 and thereby increase cooling of the light emitting device 400, the body 1201 can include a series of heat radiating fins 1203 located on the sides of the body 1201. To further increase the radiation of heat, the outer surface of the body 1201 can be treated to increase its emissivity such as for example painted black or anodized. The body 1201 further comprises a thermally conductive pad that may be placed in contact with a thermally conductive base of the light emitting device 400. The form factor of the body 1201 is configured to enable the reflector lamp 1200 to be retrofitted directly in a standard six inch downlighting fixture (a "can") as are commonly used in the United States.

The light emitting device 400 includes a wavelength conversion component 100 having phosphors embedded within a hermetic material, as described above in FIG. 1. The wavelength conversion component 100 may be located on top of a light emitting device housing associated with the light emitting device 400, as described above in FIGS. 4A and 4B. The light emitting device 400 may be attached to the body 1201 such that the thermally conductive base of the light emitting device 400 may be in thermal contact with the thermally conductive pad of the body 1201.

The reflector lamp 1200 further comprises a generally frustoconical light reflector 1205 having a paraboloidal light reflective inner surface which is configured to define the selected emission angle (beam spread) of the downlight (i.e. 60° in this example). The reflector 1205 is preferably made of Acrylonitrile butadiene styrene (ABS) with a metallization layer.

Figure 12A:
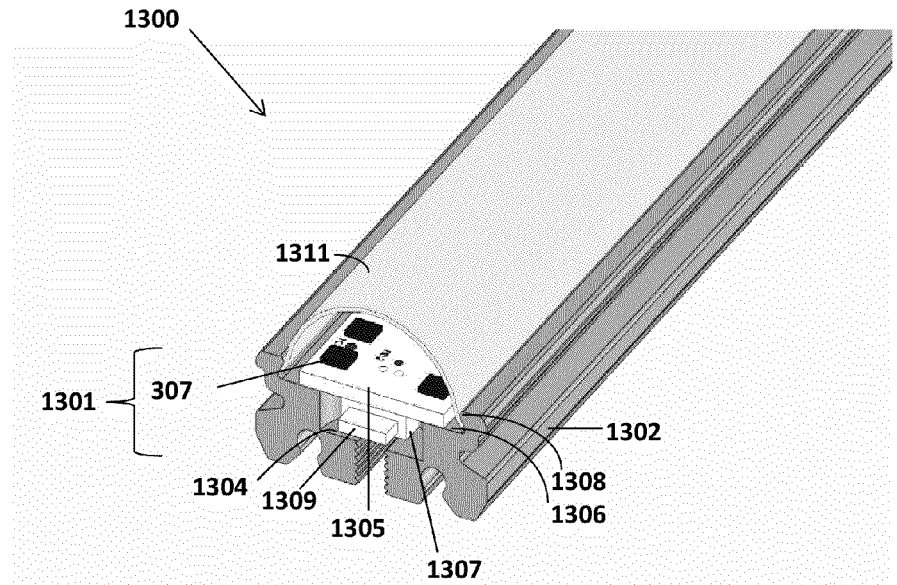
FIGS. 12A and 12B illustrate another example of an application of a wavelength conversion component in accordance with some embodiments.
Figure 12B:
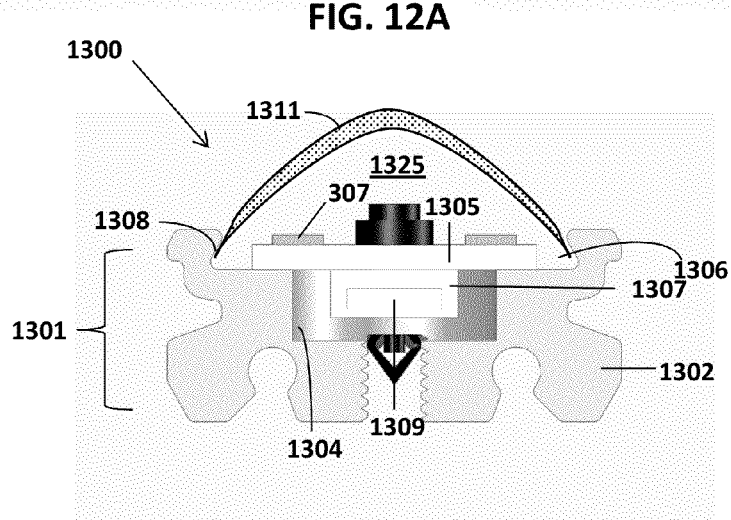

FIGS. 12A and 12B illustrate another example of an application of a light emitting device in accordance with some embodiments. FIGS. 12A and 12B illustrate an LED linear lamp 1300 that utilizes remote wavelength conversion in accordance with some embodiments. FIG. 12A is a three-dimensional perspective view of the linear lamp 1300 and FIG. 12B is a cross-sectional view of the linear lamp 1300. The LED linear lamp 1300 is intended to be used as an energy efficient replacement for a conventional incandescent or fluorescent tube lamp.

The linear lamp 1300 comprises an elongated thermally conductive body 1301 fabricated from, for example, die cast aluminum. The form factor of the body 1301 is configured to be mounted with a standard linear lamp housing. The body 1301 further comprises a first recessed channel 1304, wherein a rectangular tube-like case 1307 containing some electrical components (e.g., electrical wires) of the linear lamp 1300 may be situated. The case 1307 may further comprise an electrical connector (e.g., plug) 1309 extending past the length of the body 1301 on one end, and a recessed complimentary socket (not shown) configured to receive a connector on another end. This allows several linear lamps 1300 to be connected in series to cover a desired area. Individual linear lamps 1300 may range from 1 foot to 6 feet in length.

The body 1301 functions as a heat sink and dissipates heat generated by the light emitters 307. To increase heat radiation from the linear lamp 1300 and thereby increase cooling, the body 1301 can include a series of heat radiating fins 1302 located on the sides of the body 1301. To further increase heat radiation from the linear lamp 1300, the outer surface of the body 1301 can be treated to increase its emissivity such as for example painted black or anodized.

Light emitters 307 may be mounted on a rectangular shaped MCPCB 1305. The under surface of the MCPCB 1305 sits in thermal contact with a second recessed channel 1306 that includes inclined walls 1308.

A generally hemi-spherical elongated wavelength conversion component 1311 may be positioned remote to the light emitters 307. The wavelength conversion component 1311 may be formed from a hermetic material embedded with phosphors, as described above. The wavelength conversion component 1311 may be secured within the second recessed channel 1306 by sliding the wavelength conversion component 1311 under the inclined walls 1308 such that the wavelength conversion component 1311 engages with the inclined walls 1308. Alternatively, the wavelength conversion component 1311 may be flexibly placed under the inclined walls 1308 such that the wavelength conversion component 1311 engages with the inclined walls 1308.

In alternative embodiments, the wavelength conversion component of the linear lamp may be configured in the shape of a generally planar strip. In such embodiments, it will be appreciated that the second recessed channel may instead have vertical walls that extend to allow the wavelength conversion component to be received by the second recessed channel.

Figure 13A:
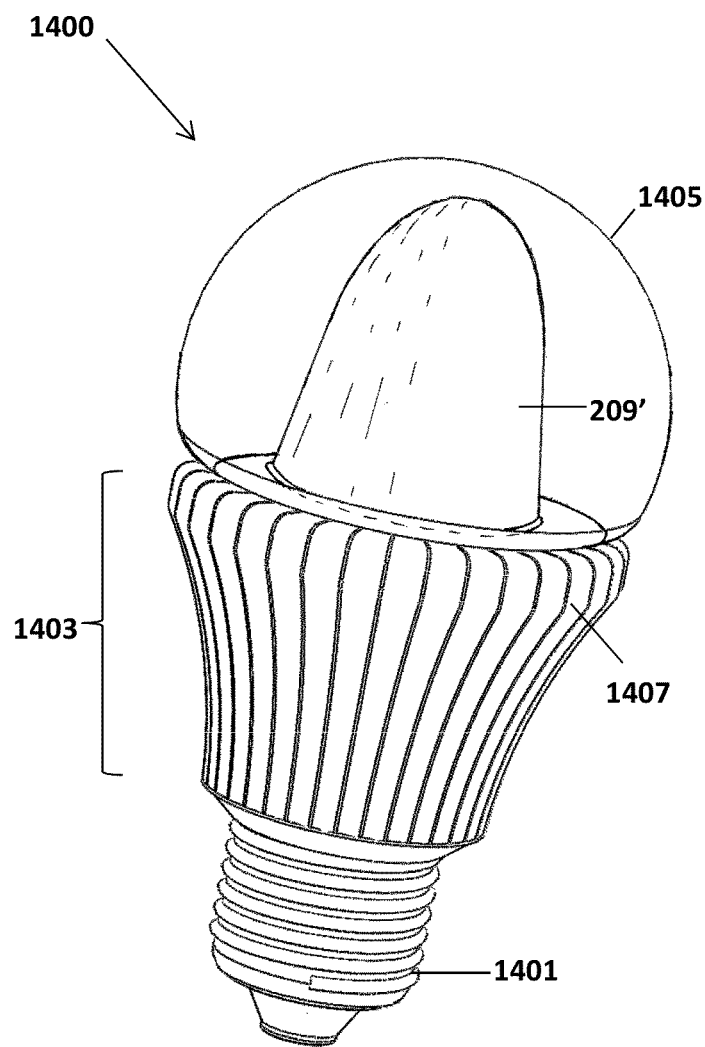
FIGS. 13A and 13B illustrate a perspective view and a cross-sectional view of an application of a wavelength conversion component in accordance with some embodiments.
Figure 13B:
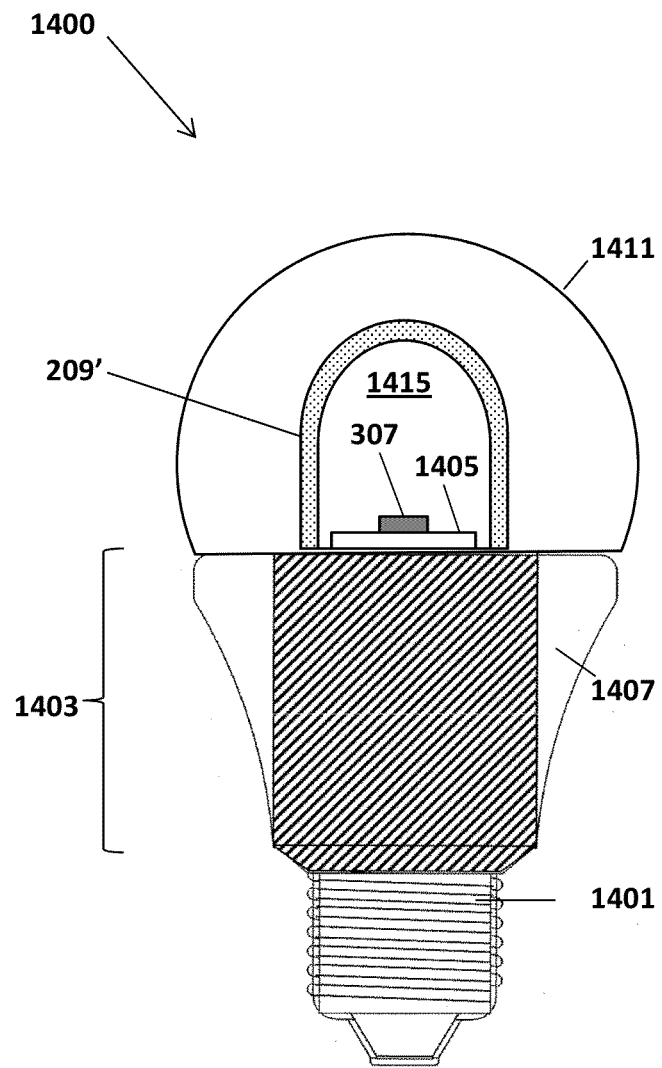

FIGS. 13A and 13B illustrate a perspective view and a cross-sectional view of an application of a light emitting device in accordance with some embodiments. FIGS. 13A and 13B illustrate an LED light bulb 1400. The LED light bulb 1400 is intended to be used as an energy efficient replacement for a conventional incandescent or fluorescent light bulb.

The light bulb 1400 comprises a screw base 1401 that is configured to fit within standard light bulb sockets, e.g. implemented as a standard Edison screw base. The light bulb 1400 may further comprise a thermally conductive body 1403 fabricated from, for example, die cast aluminum. The body functions as a heat sink and dissipates heat generated by the light emitters 307. To increase heat radiation from the light bulb 1400 and thereby increase cooling of the light bulb 1400, the body 1403 can include a series of latitudinal radially extending heat radiating fins 1407. To further increase the radiation of heat, the outer surface of the body 1403 can be treated to increase its emissivity such as for example painted black or anodized.

Light emitters 307, such as the ones described above, may be mounted on an MCPCB 1405. The light bulb 1400 comprises a wavelength conversion component 209' having a three-dimensional shape (e.g., elongated dome shaped and/or ellipsoidal shell) that encloses the light emitters 307. The three dimensional wavelength conversion component 209' may comprise a phosphor material embedded within a hermetic material.

An envelope 1411 may extend around the upper portion of the LED light bulb 1400, enclosing the light emitters 307 and the wavelength conversion component 1209'. The envelope 1411 is a light-transmissive material (e.g. glass or plastic) that provides protective and/or diffusive properties for the LED light bulb 1400.

Figure 14:
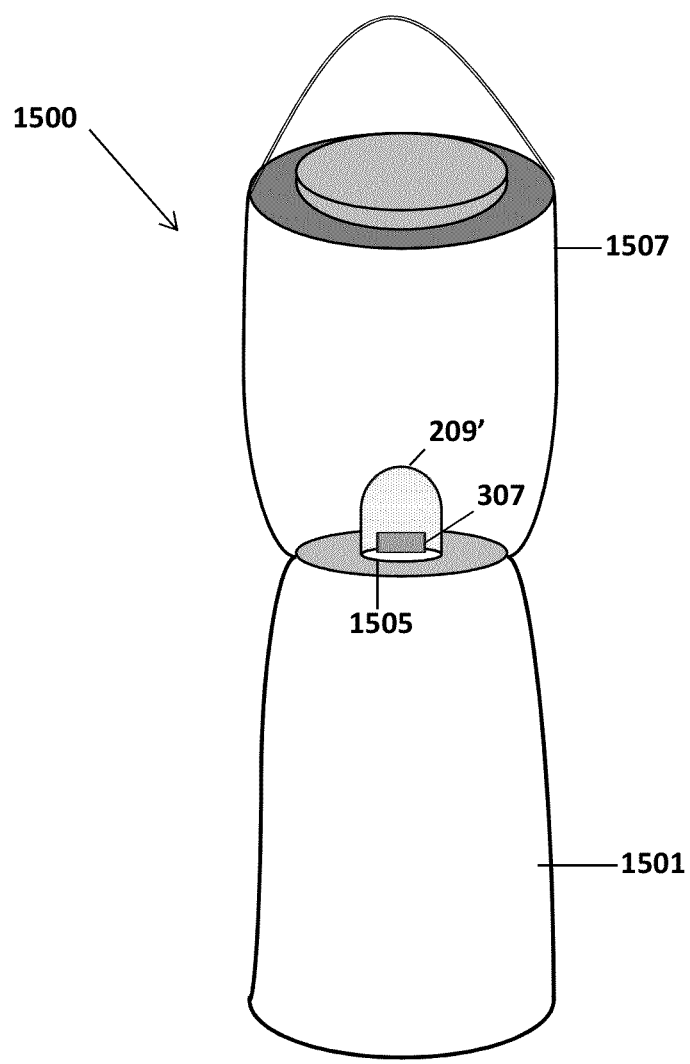
FIG. 14 illustrates a perspective of another application of a wavelength conversion component in accordance with some embodiments.

FIG. 14 illustrates a perspective view of another application of a wavelength conversion component in accordance with some embodiments. FIG. 14 illustrates an LED lantern 1500. The LED light lantern 1500 is intended to be used as an energy efficient replacement for conventional gas and fluorescent lanterns (e.g., camping lanterns).

The lantern 1500 comprises a generally cylindrical thermally conductive body 1501 fabricated from, for example, plastic material or pressed metal. The body 1501 further includes an internal heat sink which dissipates heat generated by the light emitters. To increase heat radiation from the lantern 1500 and thereby increase cooling of the lantern 1500, the outer surface of the body can be treated to increase its emissivity such as for example painted black or anodized.

Light emitters 307, such as the ones described above, may be mounted on an MCPCB 1505. The lantern 1500 also comprises a three-dimensional (e.g., elongated dome shaped and/or ellipsoidal shell) wavelength conversion component 209' that extends from the MCPCB 1505. The wavelength conversion component 209' comprises phosphors embedded within a hermetic material.

A light transmissive cover 1507 may extend around the upper portion of the lantern, surrounding the light emitters 307 and the wavelength conversion component 209'. The light transmissive cover 1507 comprises a light-transmissive material (e.g. glass or plastic) that provides protective and/or diffusive properties for the LED lantern 1500. The lantern 1500 may further comprise a lid that sits on top of the light transmissive cover 1507 to enclose the light emitters 307 and the wavelength conversion component 209'.

The above applications of light emitting devices describe a remote wavelength conversion configuration, wherein a wavelength conversion component is remote to one or more light emitters. The wavelength conversion component and body of those light emitting devices define an interior volume wherein the light emitters are located. The interior volume may also be referred to as a light mixing chamber. For example, in the downlight 1000, 1100 of FIGS. 9A, 9B, 9C, 10A, 10B, and 10C, an interior volume 1029 is defined by the wavelength conversion component 200, 209', the light reflective chamber mask 1015, and the body of the downlight 1001. In the linear lamp 1300 of FIGS. 12A and 12B, an interior volume 1325 is defined by the wavelength conversion component 1311 and the body of the linear lamp 1301. In the light bulb 1400 of FIGS. 13A and 13B, an interior volume 1415 is defined by the wavelength conversion component 209' and the body of the light bulb 1403. Such an interior volume provides a physical separation (air gap) of the wavelength conversion component from the light emitters that improves the thermal characteristics of the light emitting device. Due to the isotropic nature of photoluminescence light generation, approximately half of the light generated by the phosphor material can be emitted in a direction towards the light emitters and can end up in the light mixing chamber. It is believed that on average as little as 1 in a 10,000 interactions of a photon with a phosphor material particle results in absorption and generation of photoluminescence light. The majority, about 99.99%, of interactions of photons with a phosphor particle result in scattering of the photon. Due to the isotropic nature of the scattering process on average half the scattered photons will be in a direction back towards the light emitters. As a result up to half of the light generated by the light emitters that is not absorbed by the phosphor material can also end up back in the light mixing chamber. To maximize light emission from the device and to improve the overall efficiency of the light emitting device the interior volume of the mixing chamber includes light reflective surfaces to redirect—light in—the interior volume towards the wavelength conversion component and out of the device. The light mixing chamber may also operate to mix light within the chamber. The light mixing chamber can be defined by the wavelength conversion component in conjunction with another component of the device such a device body or housing (e.g., dome-shaped wavelength conversion component encloses light emitters located on a base of device body to define light mixing chamber, or planar wavelength conversion component placed on a chamber shaped component to enclose light emitters located on a base of device body and surrounded by the chamber shaped component to define light mixing chamber). For example, the downlight 1000, 1100 of FIGS. 9A, 9B, 9C, 10A, 10B, and 10C, includes an MCPCB 1009, on which the light emitters 307 are mounted, comprising light reflective material and a light reflective chamber wall mask 1015 to facilitate the redirection of light reflected back into the interior volume towards the wavelength conversion component 200, 209'. The linear lamp 1300 of FIGS. 12A and 12B includes an MCPCB 1305, on which the light emitters 307 are mounted, comprising light reflective material to facilitate the redirection of light reflected back into the interior volume towards the wavelength conversion component 1311. The light bulb 1400 of FIGS. 13A and 13B also includes an MCPCB 1405, on which the light emitters 307 are mounted, to facilitate the redirection of light reflected back into the interior volume towards the wavelength conversion component 209'.

The above applications of light emitting devices describe only a few embodiments with which the claimed invention may be applied. It is important to note that the claimed invention may be applied to other types light emitting device applications, including but not limited to, wall lamps, pendant lamps, chandeliers, recessed lights, track lights, accent lights, stage lighting, movie lighting, street lights, flood lights, beacon lights, security lights, traffic lights, headlamps, taillights, signs, etc.

Therefore, what has been described are improved wavelength conversion components comprising photo-luminescent materials embedded into a hermetic material. In some embodiments, phosphor materials are embedded into a layer of glass, which is then utilized in a remote phosphor LED lighting apparatus. Methods for manufacturing these advanced wavelength conversion components were also described.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A wavelength conversion component embodied in a light emitting device, comprising:
    an amorphous hermetic layer that is optically transparent to wavelengths of the range of 400 nm to 700 nm;
    a light-transmissive substrate layer, wherein the substrate layer and the amorphous hermetic layer are in direct contact
    a photo-luminescent material embedded within the amorphous hermetic layer, comprising a phosphor operable to emit light of a first wavelength range when excited by excitation light of a second wavelength range; and
    wherein light of the first wavelength range has a longer wavelength than light of the second wavelength range;
    at least one solid-state light emitter operable to generate excitation light, wherein the at least one solid-state light emitter is spaced apart from the amorphous hermetic layer by an air gap.

2. The wavelength conversion component of claim 1, wherein the substrate layer and the amorphous hermetic layer are composed of the same material.

3. The wavelength conversion component of claim 2, wherein the glass is formed from glass frit or glass powder.

4. The wavelength conversion component of claim 1, wherein the amorphous hermetic layer comprises glass.

5. The wavelength conversion component of claim 1, further comprising a second amorphous hermetic layer having a second photo-luminescent material embedded within the second amorphous hermetic layer, wherein the photo-luminescent material possess different material properties from the second photo-luminescent material.

6. The wavelength conversion component of claim 5 in which the photo-luminescent material and the second photo-luminescent material correspond to different phosphor materials.

7. The wavelength conversion component of claim 5 in which the photo-luminescent material and the second photo-luminescent material correspond to different color producing materials.

8. The wavelength conversion component of claim 1 wherein the at least one solid-state light emitter is spaced apart from the amorphous hermetic layer by at least 1 cm.

9. The wavelength conversion component of claim 1 wherein the at least one solid-state light emitter comprises a blue light LED and the amorphous hermetic layer comprises a phosphor material, where a combination of light wavelengths producable from the blue light LED and the phosphor material results in white-appearing light.

10. The wavelength conversion component of claim 1, wherein the light emitting device is selected from the group consisting of: downlights, light bulbs, linear lamps, lanterns, wall lamps, pendant lamps, chandeliers, recessed lights, track lights, accent lights, stage lighting, movie lighting, street lights, flood lights, beacon lights, security lights, traffic lights, headlamps, taillights, and signs.

11. The wavelength conversion component of claim 1, further comprising:
    an elongate housing, wherein the at least one solid-state light emitter is housed within the elongate housing; and
    wherein the amorphous hermetic layer is elongate in form and configured to in part at least define a light mixing chamber.

12. The wavelength conversion component of claim 1, further comprising:
- a body housing the at least one solid-state light emitter, wherein the body is configured to be positioned within a downlighting fixture such that the downlight emits light in a downward direction; and
- wherein the amorphous hermetic layer is configured to in part at least define a light mixing chamber.

13. The wavelength conversion component of claim 1, further comprising:
- a connector base configured to be inserted in a socket to form an electrical connection for the at least one solid-state light emitter; and
- wherein the amorphous hermetic layer has a three dimensional shape that is configured to enclose the at least one solid-state light emitter and to in part at least define a light mixing chamber.

14. The wavelength conversion component of claim 1, wherein the amorphous hermetic layer comprises a material having a firing temperature between 400 and 600 degrees Celsius.

* * * * *